US012026856B2

(12) United States Patent
Narita et al.

(10) Patent No.: US 12,026,856 B2
(45) Date of Patent: Jul. 2, 2024

(54) IMAGE STABILIZATION APPARATUS, METHOD OF CONTROLLING SAME, AND STORAGE MEDIUM

(71) Applicant: CANON KABUSHIKI KAISHA, Tokyo (JP)

(72) Inventors: Yu Narita, Kanagawa (JP); Kazuki Konishi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/148,823

(22) Filed: Dec. 30, 2022

(65) Prior Publication Data
US 2023/0136616 A1 May 4, 2023

Related U.S. Application Data

(63) Continuation of application No. 17/116,868, filed on Dec. 9, 2020, now Pat. No. 11,575,834.

(30) Foreign Application Priority Data

Dec. 17, 2019 (JP) .................................. 2019-227705
Sep. 14, 2020 (JP) .................................. 2020-154011

(51) Int. Cl.
*G06T 5/73* (2024.01)
*G06T 7/20* (2017.01)
(Continued)

(52) U.S. Cl.
CPC .................. *G06T 5/73* (2024.01); *G06T 7/20* (2013.01); *G06V 10/25* (2022.01); *G06V 10/763* (2022.01);
(Continued)

(58) Field of Classification Search
CPC . H04N 23/68–689; G06T 7/215; G06T 5/003; G06T 7/20; G03B 5/04;
(Continued)

(56) References Cited

U.S. PATENT DOCUMENTS

2008/0186386 A1* 8/2008 Okada ..................... H04N 23/68
348/208.4
2008/0231715 A1* 9/2008 Endo ....................... H04N 23/68
348/208.99

(Continued)

FOREIGN PATENT DOCUMENTS

JP 2007-201534 A 8/2007

*Primary Examiner* — Paul M Berardesca
(74) *Attorney, Agent, or Firm* — CANON U.S.A., INC. IP Division

(57) ABSTRACT

An apparatus includes a subject detection unit configured to detect a specific subject in an input image, an acquisition unit configured to acquire camera information, an estimation unit configured to estimate a target of interest in an image using the subject information and the camera information, a first motion detection unit configured to detect background motion and subject motion, a conversion unit configured to convert the detected background motion and the detected subject motion to a first blur correction amount for correcting background blur and a second blur correction amount for correcting subject blur, respectively, and a correction amount calculation unit configured to, based on the target of interest, combine the first blur correction amount and the second blur correction amount and generate a final blur correction amount.

21 Claims, 20 Drawing Sheets

(51) Int. Cl.
  *G06V 10/25*   (2022.01)
  *G06V 10/762*  (2022.01)
  *G06V 10/98*   (2022.01)
  *G06V 40/10*   (2022.01)
  *H04N 23/60*   (2023.01)
  *H04N 23/61*   (2023.01)
  *H04N 23/63*   (2023.01)
  *H04N 23/667*  (2023.01)
  *H04N 23/68*   (2023.01)

(52) U.S. Cl.
  CPC .............. *G06V 10/98* (2022.01); *G06V 40/10* (2022.01); *H04N 23/61* (2023.01); *H04N 23/633* (2023.01); *H04N 23/64* (2023.01); *H04N 23/667* (2023.01); *H04N 23/6811* (2023.01); *H04N 23/6812* (2023.01); *H04N 23/683* (2023.01)

(58) Field of Classification Search
  CPC ...... G03B 2205/00–0084; G02B 27/64; G02B 27/646; G06V 40/10
  See application file for complete search history.

(56) References Cited

U.S. PATENT DOCUMENTS

| | | | | |
|---|---|---|---|---|
| 2014/0354834 | A1* | 12/2014 | Narita | H04N 23/682 |
| | | | | 348/208.4 |
| 2018/0063436 | A1* | 3/2018 | Miyazawa | H04N 23/6811 |
| 2021/0203850 | A1* | 7/2021 | Konishi | H04N 23/682 |
| 2022/0138964 | A1* | 5/2022 | Gintsburg | H04N 5/144 |
| | | | | 382/103 |

* cited by examiner

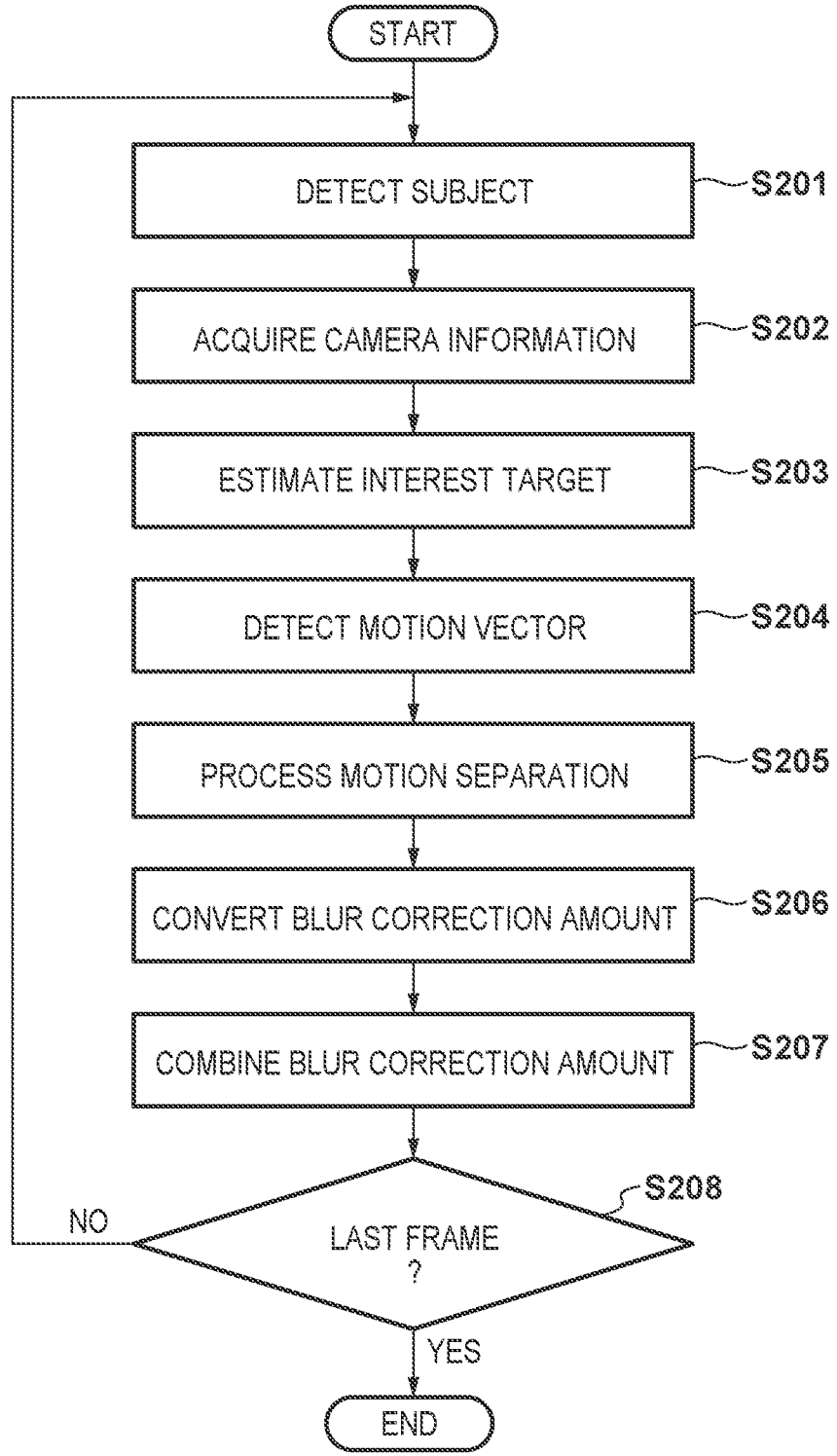

FIG. 3

| CAMERA INFORMATION + SUBJECT INFORMATION | INTEREST TARGET | BACKGROUND | SUBJECT |
|---|---|---|---|
| IMAGE CAPTURE MODE | | LANDSCAPE (0.9/0.1) | PORTRAIT (0.1/0.9) |
| SHUTTER SPEED | | SLOW (0.7/0.3) | FAST (0.3/0.7) |
| AF AREA | | LARGE ZONE AF (0.8/0.2) | FACE RECOGNITION AF (0.2/0.8) |
| SUBJECT INFORMATION | PERSON-LIKENESS | LOW (0.7/0.3) | HIGH (0.3/0.7) |
| SUBJECT INFORMATION | SIZE | SMALL (0.8/0.2) | LARGE (0.2/0.8) |
| SUBJECT INFORMATION | MOTION | LARGE (0.6/0.4) | SMALL (0.4/0.6) |

*NUMERICAL VALUES INSIDE ( ) ARE EXAMPLES OF BACKGROUND DEGREE/SUBJECT DEGREE

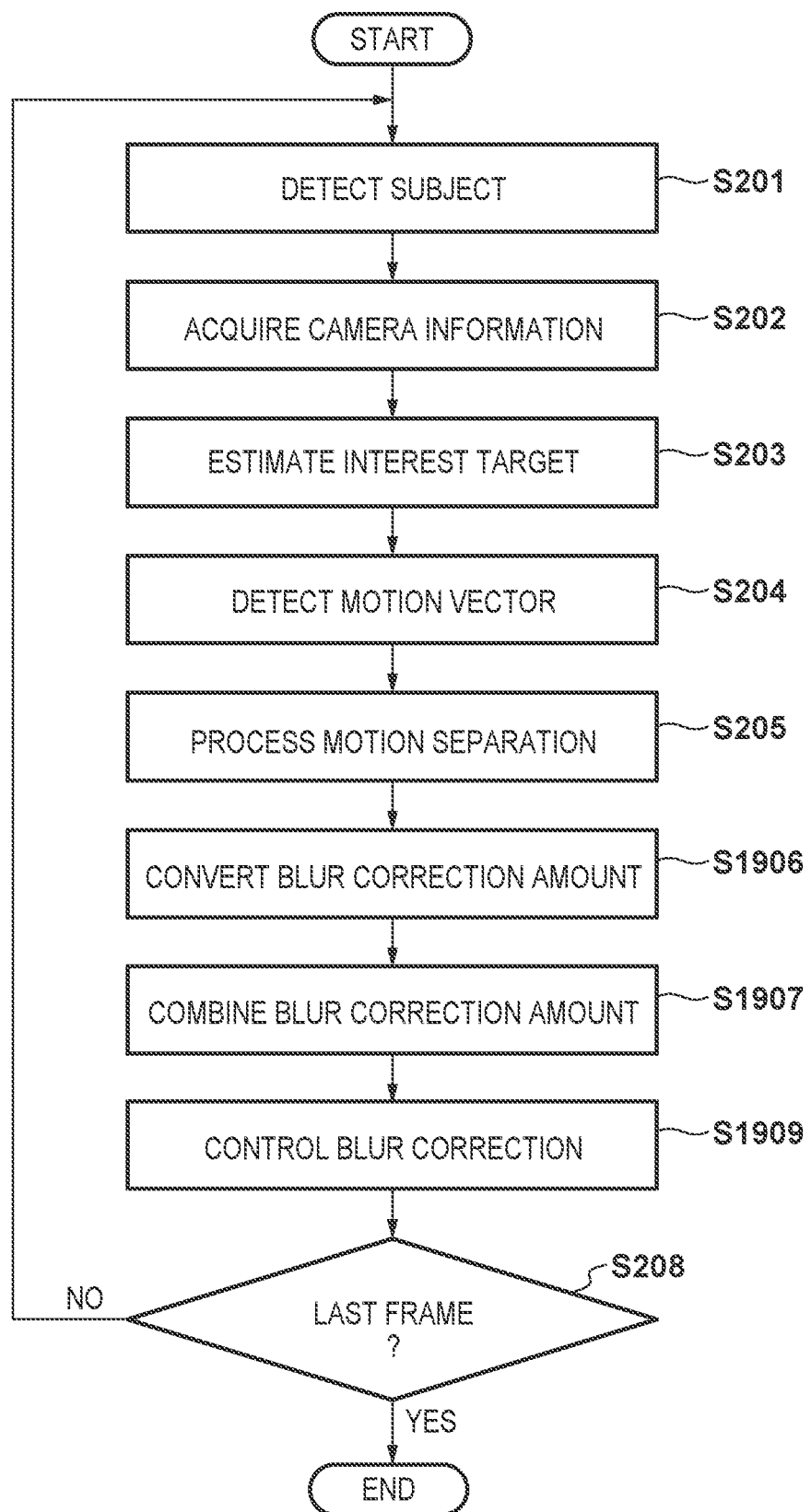

FIG. 21

| CONTROL OF<br>IMAGE CUTOUT POSITION<br>Fcc, βc | | THIRD BLUR<br>CORRECTION<br>AMOUNT<br>Fcls | CORRECTION LENS/<br>SHIFT MECHANISM<br>GAIN<br>βl, βs |
|---|---|---|---|
| Fc(Hz) | GAIN (%) | Fc(Hz) | GAIN (%) |
| Fcc0 | 100% | Fcls0 | 100% |
| Fcc1 | βc1 | HIGHER FREQUENCY BETWEEN Fcls0 AND SETTING VALUE | LOWER VALUE BETWEEN 100% AND SETTING VALUE |
| Fcc2 | βc2 | HIGHER FREQUENCY BETWEEN Fcls2 AND SETTING VALUE | LOWER VALUE BETWEEN βls2 AND SETTING VALUE |
| Fcc3 | βc3 | HIGHER FREQUENCY BETWEEN Fcls3 AND SETTING VALUE | LOWER VALUE BETWEEN βls3 AND SETTING VALUE |

FIG. 22

| THIRD BLUR<br>CORRECTION<br>AMOUNT<br>Fcls | | CORRECTION LENS/<br>SHIFT<br>MECHANISM GAIN<br>βl, βs | CONTROL OF<br>IMAGE CUTOUT POSITION<br>Fcc, βc | |
|---|---|---|---|---|
| Fc(Hz) | GAIN (%) | | Fc(Hz) | GAIN (%) |
| Fcls0 | 100% | | LOWER FREQUENCY BETWEEN Fcc1 AND SETTING VALUE | HIGHER VALUE BETWEEN βc1 AND SETTING VALUE |
| Fcls2 | βls2 | | LOWER FREQUENCY BETWEEN Fcc2 AND SETTING VALUE | HIGHER VALUE BETWEEN βc2 AND SETTING VALUE |
| Fcls3 | βls3 | | LOWER FREQUENCY BETWEEN Fcc3 AND SETTING VALUE | HIGHER VALUE BETWEEN βc3 AND SETTING VALUE |

IMAGE STABILIZATION APPARATUS, METHOD OF CONTROLLING SAME, AND STORAGE MEDIUM

CROSS-REFERENCE TO RELATED APPLICATION

This application is a Continuation of U.S. application Ser. No. 17/116,868, filed Dec. 9, 2020, which claims priority from of Japanese Patent Application No. 2019-227705, filed Dec. 17, 2019, and Japanese Patent Application No. 2020-154011, filed Sep. 14, 2020, which are hereby incorporated by reference herein in their entireties.

BACKGROUND OF THE DISCLOSURE

Field of the Disclosure

The aspect of the embodiments relates to technology for image blur correction in an image capture device.

Description of the Related Art

In an image capture device such as a digital camera, image blur may be caused by "hand shake" of the user holding a camera body portion. Also, image blur may be caused by "subject shake" where a subject such as a person moves, changing the subject position.

Examples of methods for detecting "hand shake" include a method using an angular velocity sensor attached to an image capture device and a method using a motion vector of a stationary object (background) in a captured image. Also, an example of a method of detecting "subject shake" includes a method that detects a subject in a captured image and uses a motion vector of a subject.

Systems for correcting image blur caused by "hand shake" and/or "subject shake" include optical blur correction and electronic blur correction. In optical blur correction, image blur is corrected by moving a correction lens or an image sensor in an optical system according to shaking and moving an image formed on a light-receiving surface of the image sensor to cancel shake. In electronic blur correction, blur is artificially corrected via image processing on a captured image.

Typically, the shake amount (the direction and size of shake) differs between "hand shake" and "subject shake". Thus, both cannot be fully corrected. Regarding this, for example, Japanese Patent Laid-Open No. 2007-201534 describes technology for correcting "subject shake" when a face of a subject is detected and correcting "hand shake" when a face of a subject is not detected.

Out of "hand shake" and "subject shake", which one should be corrected may conceivably be different depending on the user's intention (target of interest) in the scene being captured. For example, when the user's interest is targeted on the background, "hand shake", which shakes the entire screen, is corrected. However, when the user's interest is targeted on a main subject, "subject shake" is corrected. Thus, depending on the user's intentions that change from scene to scene, the target of shake correction is to be appropriately controlled.

However, in the technology described in Japanese Patent Laid-Open No. 2007-201534, the target of shake correction switches depending on whether or not a face is detected regardless of the user's intentions. Thus, a problem remains that an image blur correction effect that matches the user's intention for each scene cannot be obtained. Furthermore, when the technology of Japanese Patent Laid-Open No. 2007-201534 is applied to video, the target of shake correction switches in a binary manner depending on whether or not a face is detected. Thus, though subtle, an unnatural shift in the video is created when switching.

SUMMARY OF THE DISCLOSURE

According to a first aspect of the embodiments, there is provided an image stabilization apparatus comprising: at least one processor at least one processor; and at least a memory coupled to the at least processor storing instructions that, when executed by the at least processor, cause the at least processor to function as: a subject detection unit configured to detect a specific subject in an input image and output subject information; an acquisition unit configured to acquire camera information required to estimate an image-capturing state; an estimation unit configured to estimate a target of interest in an image using the subject information and the camera information; a first motion detection unit configured to detect background motion and subject motion in an input image; a conversion unit configured to convert the detected background motion and the detected subject motion to a first blur correction amount for correcting background blur and a second blur correction amount for correcting subject blur, respectively; and a correction amount calculation unit configured to, based on the estimated target of interest, combine the first blur correction amount and the second blur correction amount and generate a final blur correction amount.

According to a second aspect of the embodiments, there is provided a method: detecting a specific subject in an input image and outputting subject information; acquiring camera information required to estimate an image-capturing state; estimating a target of interest in an image using the subject information and the camera information; detecting background motion and subject motion in an input image; converting the detected background motion and the detected subject motion to a first blur correction amount for correcting background blur and a second blur correction amount for correcting subject blur, respectively; and based on the target of interest, combining the first blur correction amount and the second blur correction amount and generating a final blur correction amount.

Further features of the disclosure will become apparent from the following description of exemplary embodiments with reference to the attached drawings.

BRIEF DESCRIPTION OF THE DRAWINGS

FIG. 2 is a flowchart for describing the processing executed in the first embodiment.

FIG. 3 is a diagram illustrating the relationship between camera information and target of interest.

FIG. 19 is a flowchart for describing the processing executed in the fourth embodiment.

FIG. 21 is a diagram illustrating a table for resetting a coefficient and a gain of a high-pass filter.

FIG. 22 is a diagram illustrating a table for resetting a coefficient and a gain of a high-pass filter.

DESCRIPTION OF THE EMBODIMENTS

Figure 1:
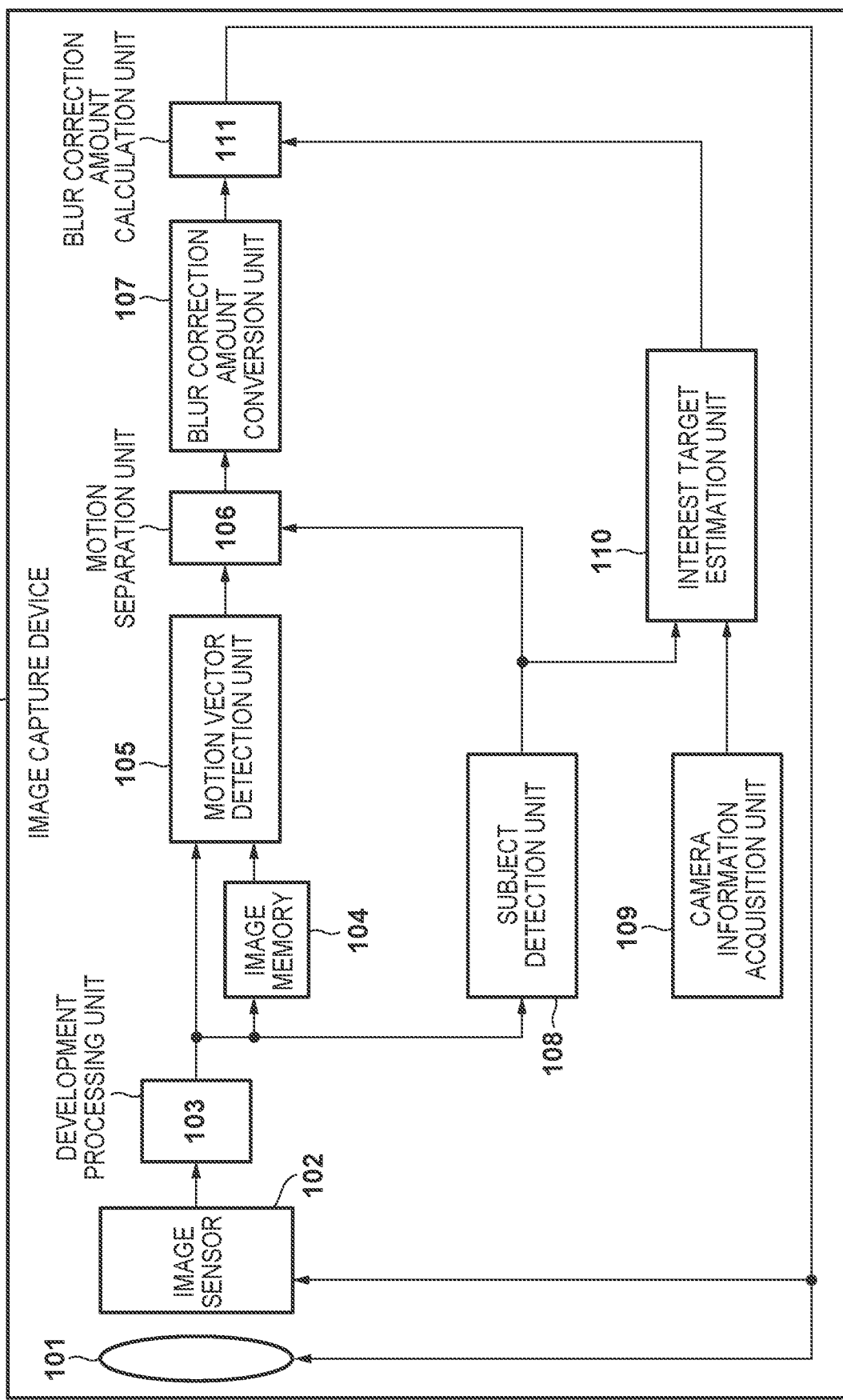
FIG. 1 is a block diagram illustrating the configuration of an image capture device according to a first embodiment of the disclosure.

Hereinafter, embodiments will be described in detail with reference to the attached drawings. Note, the following embodiments are not intended to limit the scope of the claimed disclosure. Multiple features are described in the embodiments, but limitation is not made a disclosure that requires all such features, and multiple such features may be combined as appropriate. Furthermore, in the attached drawings, the same reference numerals are given to the same or similar configurations, and redundant description thereof is omitted.

First Embodiment

FIG. 1 is a diagram illustrating the configuration of an image capture device according to the first embodiment of the disclosure.

As illustrated in FIG. 1, a subject image formed by an optical system 101 is converted to an image signal by an image sensor 102, subjected to development processing, such as white balance processing, color (luminance, color difference signal) conversion processing, and γ correction processing, by a development processing unit 103, and output as image data (input image data). An image memory 104 temporarily stores image data developed at the development processing unit 103 of one frame or a plurality of frames.

A motion vector detection unit 105 detects a motion vector from the image data input from the development processing unit 103 and the image memory 104. A motion separation unit 106 separates the motion vectors detected by the motion vector detection unit 105 into a first motion vector indicative of background motion and a second motion vector indicative of subject motion. A blur correction amount conversion unit 107 converts the first motion vector and the second motion vector obtained by the motion separation unit 106 into a first blur correction amount and a second blur correction amount, respectively.

A subject detection unit 108 detects a specific subject from the image data input from the development processing unit 103 and outputs subject information. Subject information unit includes, for example, a subject area (position and size of the subject), person-likeness, motion of the subject, and the like.

A camera information acquisition unit 109 acquires camera information required to estimate the image-capturing state. Camera information includes, for example, image capture mode, shutter speed, auto focus (AF) area information, focal length, user instruction information, inertial sensor information, depth information, line-of-sight information, and the like.

An interest target estimation unit 110 estimates the target of interest in the image using the subject information obtained by the subject detection unit 108 and the camera information obtained by the camera information acquisition unit 109.

A blur correction amount calculation unit 111 generates a final blur correction amount by combining the first blur correction amount and the second blur correction amount obtained by the blur correction amount conversion unit 107 on the basis of the information of the target of interest obtained by the interest target estimation unit 110.

The generated blur correction amount is output to a shift mechanism that shifts a correction lens and/or the image sensor 102 in the optical system 101, which are optical blur correction units, in a direction perpendicular to the optical axis and optical blur correction is performed. Note that the aspect of the embodiments is not limited to optical blur correction, and the blur correction amount may be output to an electronic blur correction unit (not illustrated) and electronic blur correction may be performed.

Next, image blur correction operation in an image capture device 100 configured as described above will be described using the flowchart illustrated in FIG. 2.

In step S201, the subject detection unit 108 detects a specific subject from image data input from the development processing unit 103 and outputs subject information. The subject information may be subject area information (position and size of the subject), subject person-likeness information, or subject motion information. The specific subject is typically the face of a person. The detection method may be a known face detection method. Known face detection technology includes a method using knowledge (skin color information, parts such as the eye, nose, and mouth) relating to the face, a method using an identification device for face detection via a learning algorithm represented by a neural network, and the like. Also, to improve detection accuracy, typically a combination of these are used in face detection.

Note that in the case in which faces of a plurality of people are in an image, the face considered to be the most prominent is selected and output. In the selection method, the face is selected on the basis of having a large size, position closest to the center of the image, and high reliability of face detection, for example. Also, the face may be selected by a user from a plurality of candidates.

Using the methods described above, the subject area and the subject person-likeness can be obtained as the subject information. Also, subject motion can be obtained by finding the displacement amount of the centroid of the subject area between adjacent frame images, for example.

In step S202, the camera information acquisition unit 109 acquires camera information required to estimate the image-capturing state. For the camera information, for example, image capture mode information, shutter speed information, AF area information, focal length information, user instruction information, inertial sensor information, depth information, and line-of-sight information is used.

The image capture mode information, shutter speed information, AF area information, focal length information, and user instruction information can be acquired by reading a value set for the camera by the user. The user instruction information is information indicative of degree of interest for the background or the subject described below and is set by the user directly on the camera.

The inertial sensor information is information indicative of the positional orientation of the camera obtained by an angular velocity sensor or an acceleration sensor installed in the camera. The depth information is detected using a distance-measuring sensor or a known structure from motion (SfM) method on captured image data. The line-of-sight information is information indicative of an area where the line-of-sight is located in an image and is obtained via a method such as a known corneal reflection method.

In step S203, the interest target estimation unit 110 estimates whether the user's interest is targeted on the background or a subject on the basis of the subject information detected in step S201 and the camera information acquired in step S202.

A method of estimating the target of interest on the basis of the subject information and the camera information will be described. Here, for each piece of information, a background degree indicative of the degree to which the background is the target of interest and a subject degree indicative of the degree to which the subject is the target of interest is calculated. The combined sum of the background degree and the subject degree is represented by a value equaling 1. Note that only the background degree or only the subject degree may be calculated.

First, details relating to the subject information will be described. Regarding the position of the subject, when a subject is close to the center of the screen, there is a high probability that a subject is the target of interest for image capture. Thus, the subject degree is set high (for example, 0.8) and the background degree is set low (for example, 0.2).

Regarding the size of the subject, when a subject is large, there is a high probability that the subject is the target of interest for image capture. Thus, the subject degree is set high (for example, 0.8) and the background degree is set low (for example, 0.2).

Regarding the subject person-likeness, when the subject is person-like, there is a high probability that the subject is the target of interest for image capture. Thus, the subject degree is set high (for example, 0.7) and the background degree is set low (for example, 0.3).

Regarding the subject motion, when the subject has little motion, there is a high probability that, with the user holding the camera trying to capture an image of the subject, the subject is the target of interest. Thus, the subject degree is set high (for example, 0.6) and the background degree is set low (for example, 0.4).

Next, details relating to the camera information will be described. Regarding the image capture mode, for example, when in portrait mode, there is a high probability that a person (a subject) is the target of interest for image capture. Thus, the subject degree is set high (for example, 0.9) and the background degree is set low (for example, 0.1). However, when in landscape mode, there is a high probability that the landscape is the target of interest for image capture. Thus, the subject degree is set low (for example, 0.1) and the background degree is set high (for example, 0.9). In this way, the background degree and the subject degree can be determined using the image capture mode by assuming the image-capturing state with a high probability depending on the mode.

Regarding the shutter speed, when the shutter speed is fast, there is a high probability that a fast-moving subject is the target of interest for image capture. Thus, the subject degree is set high (for example, 0.7) and the background degree is set low (for example, 0.3).

Regarding the AF area information, when the AF area is large, there is a high probability that the background is the target of interest for image capture. Thus, the subject degree is set low (for example, 0.3) and the background degree is set high (for example, 0.7). Also, when face recognition AF or pupil recognition AF is set to on, there is a high probability that a subject, such as a person or animal, is the target of interest for image capture. Thus, the subject degree is set high (for example, 0.9) and the background degree is set low (for example, 0.1).

Regarding the line-of-sight information, when the line-of-sight information and the subject information are combined and the area where the line-of-sight is located in the image is a subject area, there is a high probability that a subject is the target of interest for image capture. Thus, the subject degree is set high (for example, 0.9) and the background degree is set low (for example, 0.1).

The user's intention regarding the focal length information and the depth information is difficult to grasp individually. An example of a method of estimating the target of interest by combining the two will be described.

When a focal length f (mm) and a distance (depth information) d (mm) to the subject are given, using the size X (mm) of the subject on the imaging surface, the size Y (mm) of the actual subject can be calculated via Formula (1) below.

$$Y=(d/f) \cdot X \qquad (1)$$

Once the size of the actual subject is known, the user's intentions can be grasped from the relationship between the size of the subject on the imaging surface and the focal length. For example, when the size of the actual subject is small and the size of the subject on the imaging surface is large and the focal length is long, the subject is very much the target of interest. Thus, when the size of the actual subject is small and the size of the subject on the imaging surface is large and the focal length is long, the subject degree is set high and the background degree is set low.

In this way, in the present embodiment, by combining a plurality of pieces of camera information, user intentions unable to be grasped from each individual piece of camera information can be grasped.

The user's intention regarding the inertial sensor information is also difficult to grasp individually. An example of a method of estimating the target of interest by combining the inertial sensor information and the subject motion information will be described. When the user's target of interest is a subject, the user moves the camera to keep the subject in a fixed position on the screen. Thus, the motion of the subject is relatively less than the motion of the camera.

Accordingly, it can be expected that the user is holding the camera trying to capture an image of the subject when the amount of motion of the subject is less than the amount of motion of the camera between frame images obtained from the inertial sensor information. In this case, there is a high probability that the subject is the target of interest for image capture. Thus, the subject degree is set high and the background degree is set low.

This thinking can also be applied to panning. When panning, the user widely swivels the camera to keep the moving subject in the center, meaning that the motion of the background is large and the motion of the subject is small. Thus, when panning, the subject degree automatically increases on the basis of the inertial sensor information and the subject motion information.

The relationships described above between the subject information and camera information and the target of interest are summarized in part in the table in FIG. 3. The values in brackets indicate examples of the background degree/subject degree described above.

In the case in which a plurality of pieces of information can be used in estimating the target of interest, the background degrees and the subject degrees are weighted for each piece of information, and a final background degree and subject degree can be calculated. The weighting can be set on the basis of the certainty of the information source, for example.

For example, take image capture mode, subject person-likeness, subject size, subject motion, shutter speed and give each the background degree of Da, Db, Dc, Dd, De, respectively, with weighting being denoted by Ga, Gb, Gc, Gd, Ge. The final background degree D can be calculated via Formula (2) below.

$$D = Ga \times Da + Gb \times Db + Gc \times Dc + Gd \times Dd + Ge \times De \quad (2)$$

In this example, for weighting, Ga is 0.3, Gb is 0.2, Gc is 0.2, Gd is 0.1, and Ge is 0.2. Here, the sum of the weights is normalized to 1. In this example, the image capture mode is landscape mode (Da=0.9), the subject person-likeness is high (Db=0.3), the subject size is small (Dc=0.8), the subject motion is small (Dd=0.4), and the shutter speed is slow (De=0.7), and solving Formula (2) for D gives an answer of 0.6. The final subject degree can be calculated in the same manner. In the case in which the information sources have the same or unknown certainties, the weights can all be the same value.

Note that when user instruction information is used as the camera information, the background degree and the subject degree can be set without estimation by user instruction of the degree of interest for the background and the subject, for example. The degree of interest may be instructed directly using values or qualitatively using high/low or like. In the case in which there are a plurality of subjects, any may be selected. Also, the background degree and the subject degree may be set independently for the horizontal direction and the vertical direction.

In step S204, the motion vector detection unit 105 detects, via template matching, a motion vector in the image data input from the development processing unit 103 and the image memory 104.

Figure 4A:
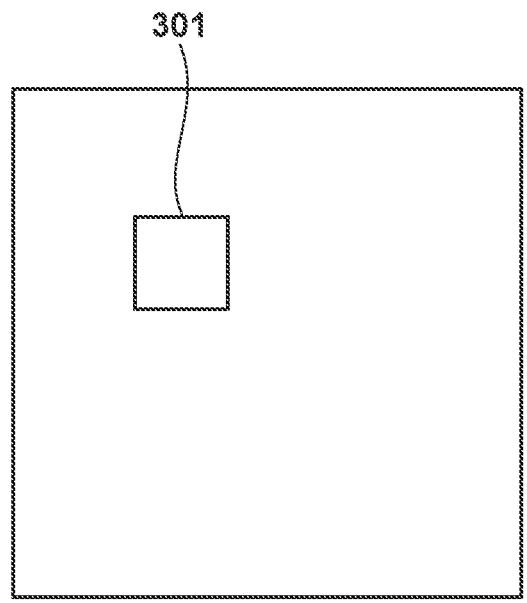
FIGS. 4A and 4B are diagrams for describing template matching.
Figure 4B:
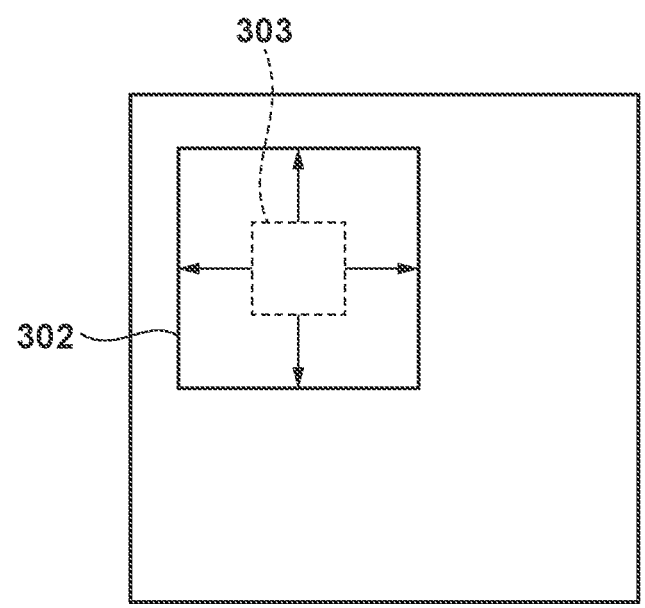

FIGS. 4A and 4B are diagrams illustrating an outline of template matching. FIG. 4A illustrates a base image, which is one of two vector detection images, and FIG. 4B illustrates a reference image, which is the other vector detection image. Here, a motion vector from a past frame image to a current frame image is calculated using, as the base image, a frame image stored in the image memory 104 and, as the reference image, image data directly input from the development processing unit 103. Note that the base image and the reference image may be interchanged, and, in this case, a motion vector is calculated from a current frame image to a past frame image.

The motion vector detection unit 105 disposes a template area 301 on the base image and a search area 302 on the reference image and calculates a correlation value between the template area 301 and the search area 302.

Here, the placement of the template area 301 is discretionary, and the template area 301 may be disposed centered at a set plurality of fixed coordinates on the screen or may be disposed centered at a feature point detected by a known method. The placement coordinates may also be set so that, using the subject information obtained in step S201, the number of template areas disposed in the subject area and disposed in not the subject area are the same. A search area with a predetermined size that encompasses the template area evenly in the up, down, left, and right directions is disposed.

In the present embodiment, the sum of absolute differences (hereinafter, abbreviated to SAD) is used as the method of calculating the correlation value. The calculation formula of SAD is represented by Formula (3).

$$S\_SAD = \Sigma_i \Sigma_j |f(i,j) - g(i,j)| \quad (3)$$

In Formula (3), $f(i,j)$ represents a luminance value at coordinates $(i,j)$ in the template area 301. Furthermore, $g(i,j)$ represents a luminance value at each coordinate in an area 303 (hereinafter referred to as a correlation value calculation area) that is a calculation target of a correlation value in the search area 302. Using SAD, an absolute value of a difference between the respective luminance values $f(i,j)$ and $g(i,j)$ in the areas 302, 303 is calculated to obtain a correlation value S_SAD. A smaller value of the correlation value S_SAD indicates that the degree of similarity of texture between the template area 301 and the correlation value calculation area 303 is high.

Note that the correlation value may be obtained using a method other than SAD, and, for example, sum of squared differences (SSD) or normalized cross-correlation (NCC) may be used.

The motion vector detection unit 105 moves the correlation value calculation area 303 through the entire search area 302 and calculates correlation values. In this way, a correlation value map for the search area 302 such as that illustrated in FIGS. 5A and 5B is created.

Figure 5A:
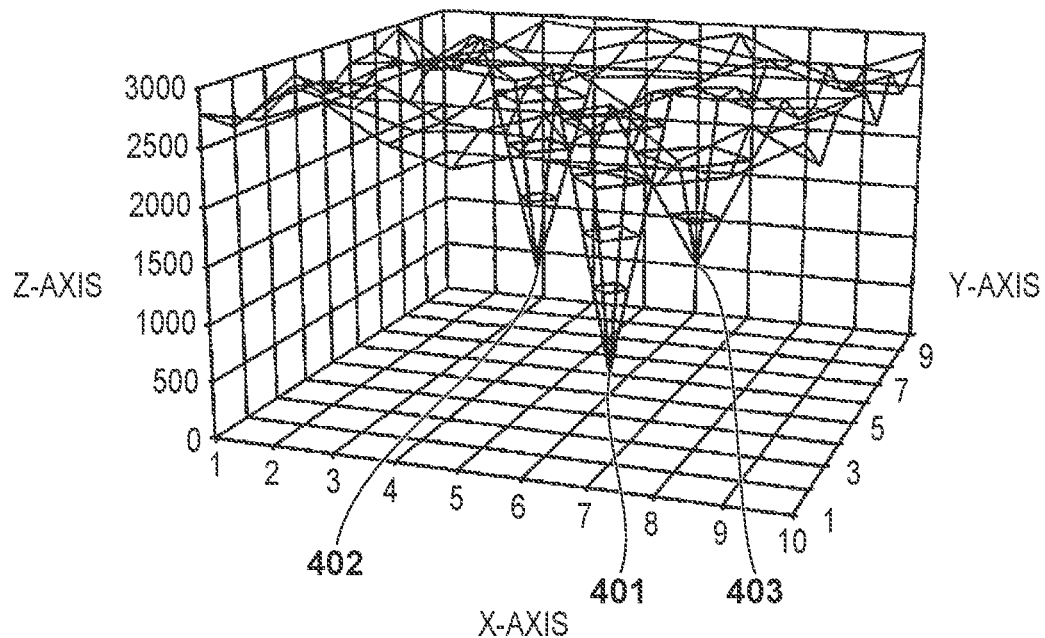
FIGS. 5A and 5B are diagrams for describing a correlation value map.

FIG. 5A illustrates a correlation value map calculated on the basis of the coordinate system of the search area 302. The X-axis and the Y-axis represent correlation value map coordinates, and the Z-axis represents the size of the correlation value at each coordinate. FIG. 5B is a diagram illustrating contour lines of FIG. 5A.

Figure 5B:
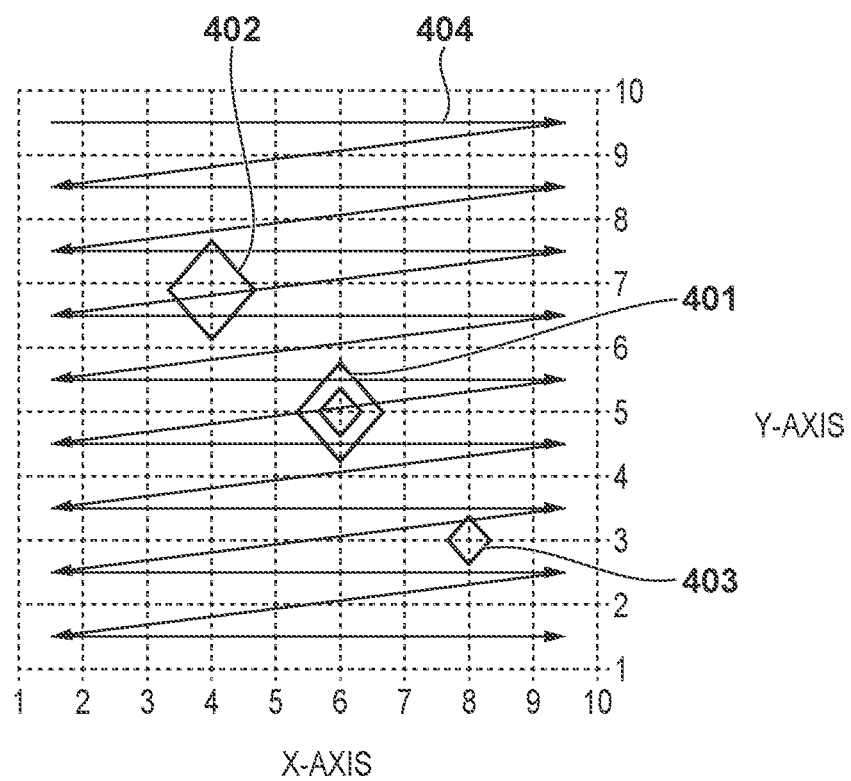

In FIGS. 5A and 5B, the lowest correlation value is a minimum value 401. It can be determined that texture very similar to the template area 301 is present in an area in which the minimum value 401 has been calculated in the search area 302. A reference numeral 402 is a second minimum value, and a reference numeral 403 is a third minimum value. This means that there are areas with similar texture subsequent to that of the minimum value 401.

In this way, the motion vector detection unit 105 calculates a correlation value between the template area 301 and the search area 302 and determines a position of the correlation value calculation area 303 with the smallest correlation value. This allows a movement destination of the template area 301 on the base image to be identified in the reference image. Also, a motion vector having a direction and a magnitude corresponding to a direction and an amount of movement toward the movement destination in the reference image based on the position of the template area in the base image can be detected.

In step S205, the motion separation unit 106 separates the motion vectors detected in step S204 into the first motion vector (hereinafter, referred to as the background vector) indicative of background motion and the second motion vector (hereinafter, referred to as the subject vector) indicative of subject motion.

An example of a separation method will now be described. First, using the subject information obtained in step S201, a first separation processing is executed in which a motion vector detected at a point belonging outside of the subject area is set as a background vector and a motion vector detected at a point belonging inside the subject area is set as a subject vector.

Note that when a subject cannot be detected, separation based on the depth information obtained in step S202 is considered, for example. In this case, the first separation processing can be executed setting a motion vector detected at a point in the image belonging to an area farther than a predetermined depth as a background vector and a motion vector detected at a point belonging to an area closer than the predetermined depth as a subject area. In the case in which a subject cannot be detected and the image has no difference in depth on the screen, all motion vectors as set as background vectors and the separation processing is ended.

Separation processing may be completed with just the first separation processing. However, with "separation based on subject area", motion vectors detected at points near the boundary between background and subject may be sorted incorrectly. Also, when the subject area is incorrect due to a problem with subject detection accuracy, the motion vectors may be sorted incorrectly. Thus, a second separation processing of "separation based on the amount of motion vectors" is further executed. Here, a known k-means method may be used, for example.

In the k-means method, the sorting cluster number k and the initial value Vk of the centroid for each cluster is to be set in advance. In this example, as separation into a background cluster and a subject cluster is executed, the cluster number k is 2. In the case in which a plurality of subjects are present, the cluster number may be changed to correspond to the number of subjects. Also, a cluster may be included for separation of a motion vector group that does not belong in the background or subject cluster.

The result of the first separation processing is used to set the initial value of the centroid for each cluster. Specifically, for each background vector obtained in the first separation processing, a histogram of movement amount in the X direction and movement amount in the Y direction is created, and a mode V1x, V1y is found for each histogram. The mode is a representative value of the background vector and thus is set as an initial value V1=(V1x, V1y) of the centroid of the background cluster. By a similar method, representative values V2x, V2y of subject vectors obtained in the first separation processing are obtained and set as an initial value V2=(V2x, V2y) of the centroid of the subject cluster.

Note that for the initial value of the background cluster, the inertial sensor information obtained in step S202 may be used instead of the background vectors. In this case, the angular velocity in the yaw direction and the pitch direction obtained from the angular velocity sensor are each integrated and converted to angles $\theta y$, $\theta p$, which are then converted to displacement amounts on the imaging surface. $V1x=f\tan(\theta y)$, $V1y=f\tan(\theta p)$ is calculated, where f is focal length.

Also, for the initial value of the subject cluster, the displacement amount of the centroid between frames of the subject area obtained in step S201 may be used instead of the subject vectors. In this case, it is assumed at the same subject can be detected in each frame.

In this manner, the cluster number and the initial value of the centroid of each cluster are set. Next, the distance between each motion vector data and each cluster centroid is calculated. Then, each motion vector data is associated with the cluster closest in distance, and the clusters are reallocated.

In the case in which the processing described above results in no change in the cluster allocation for all of the vector data or the amount of change is less than a certain preset threshold, the processing is determined to be settled and the second separation processing is ended. In other cases, the centroids of the newly allocated clusters are recalculated, then the distance between each motion vector data and each cluster centroid is calculated and the processing described above of cluster re-allocation is repeated.

Figure 6A:
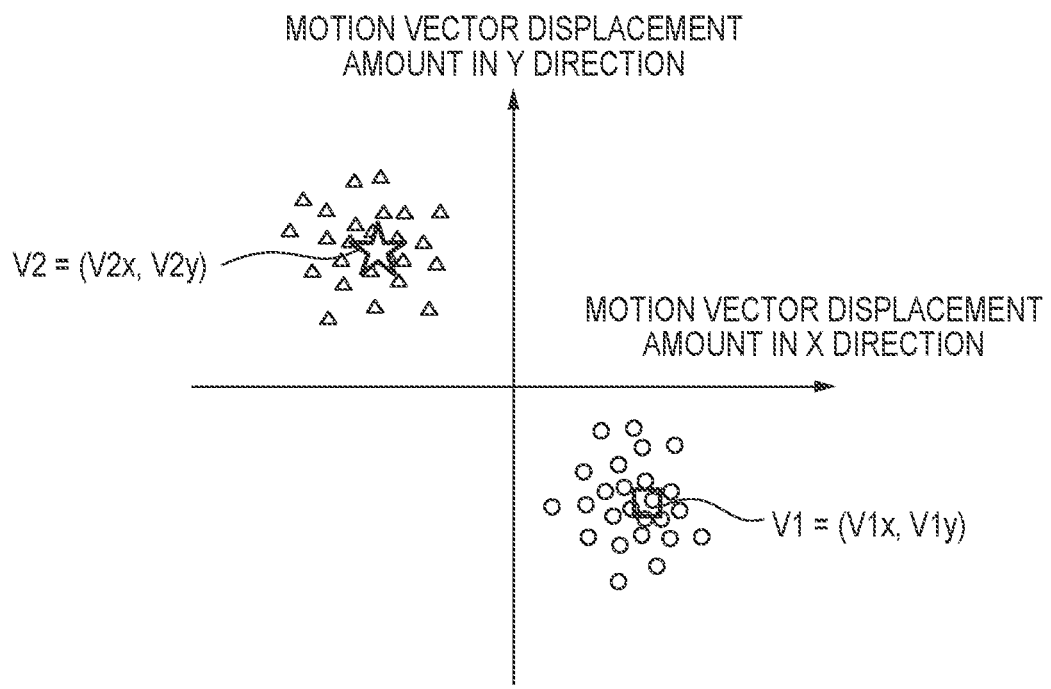
FIGS. 6A and 6B are diagrams for describing motion separation.
Figure 6B:
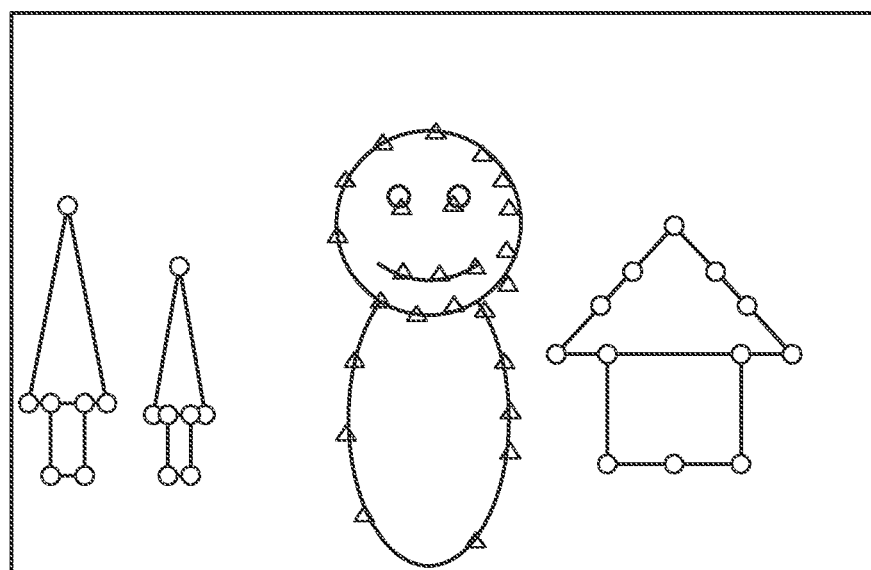

An example of the result of such motion vector separation is illustrated in FIGS. 6A and 6B.

FIG. 6A is a diagram with the motion vector displacement amount in the X direction plotted on the horizontal axis and the displacement amount in the Y direction plotted on the vertical axis. The square represents the initial value of the centroid of the background cluster, the star represents the initial value of the centroid of the subject cluster, the circles represent separated background vectors, and the triangles represent separated subject vectors.

Also, in FIG. 6B, the starting positions of the background vectors and the subject vectors of FIG. 6A are plotted on the image. From FIG. 6B, it can be seen that the background and the main subject are correctly separated.

In step S206, the blur correction amount conversion unit 107 converts the background vector and the subject vector obtained in step S205 to the first blur correction amount (hereinafter, referred to as the hand shake correction amount) and the second blur correction amount (hereinafter, referred to as the subject shake correction amount).

An example of a method of converting a motion vector to a blur correction amount includes a method using a histogram as described above. For each motion vector, a histogram of movement amount in the X direction and movement amount in the Y direction is created, and a mode is found for each histogram. The mode is a representative value of blur occurring between frames, and by finding the mode with the opposite sign, a blur correction amount that cancels the blur can be obtained.

Another example of a conversion method is a method using the corresponding relationship of feature points between frames obtained via motion vectors. From the corresponding relationship of feature points between frames, a projective transformation matrix (or an affine transformation matrix) may be calculated via a known method. The calculated projective transformation matrix is indicative of the blur occurring between frames, and by finding the inverse matrix, a blur correction amount that cancels the blur can be obtained.

In the case of a method using a histogram, only the translation component can be corrected. However, when the number of motion vectors is low, a relatively stable correction amount can be obtained. On the other hand, in the case of a method using the corresponding relationship of feature points, in addition to the translation component of the blur, the rotational component and the elevation component can be corrected. However, when the number of motion vectors is low, the correction amount is difficult to correctly obtain. Thus, the method used may be changed depending on the number of motion vectors.

In this example, a background vector is used to obtain the first blur correction amount. However, in the case in which an angular velocity sensor is provided, a background vector does not need to be used. Also, as mentioned when describing the method of calculating the initial value of the background cluster, angular velocity information obtained from the angular velocity sensor may be converted to a displacement amount on the imaging surface and used.

In step S207, the blur correction amount calculation unit 111 combines the hand shake correction amount and the subject shake correction amount obtained in step S206 on the basis of the target of interest obtained in step S203 and generates a final blur correction amount.

An example of a method of combining the hand shake correction amount and the subject shake correction amount will be described. Here, the background degree is represented as A and the subject degree is represented as 1-A. Representing the hand shake correction amount and the subject shake correction amount calculated in step S206 as H0, H1, the final, post-combination blur correction amount H can be found via the formula below.

$$H=(A \times H0)+\{(1-A) \times H1\} \qquad (4)$$

In Formula (4), when the user's interest is targeted on the background 100%, then A equals 1, making H equal H0 and the hand shake be 100% corrected. In the opposite case, when the user's interest is targeted on the subject 100%, then A equals 0, making H equal H1 and the subject shake be 100% corrected. When the user's interest is targeted on the background and the subject 50% each, then A=0.5, making hand shake be 50% corrected and subject shake be 50% corrected. In this manner, correction ratio of the hand shake and the subject shake is controlled depending on the background degree and the subject degree. Note that in a similar manner to the background degree and the subject degree, the correction ratio of the hand shake and the subject shake may be determined independently in the horizontal direction and the vertical direction.

Finally, in step S208, the image capture device 100 determines whether or not the process has been completed up to the last frame. In the case in which the process has been completed up to the last frame, the process is ended. In the case in which the process has not been completed, the process returns to step S201.

As described above, in the present embodiment, depending on the target of interest of the user, the correction ratio between hand shake and subject shake is controlled, allowing a blur correction effect desired by the user to be obtained.

Note that the technology described in the present embodiment can be applied to both video and still images. In the case of video, depending on the scene, hand shake correction and subject shake correction can be continuously switched between, which minimizes or prevents off-putting subtle image shifts caused by switching. In the case of still images, an image with a good balance between hand shake and subject shake can be generated. Also, as described above, this can also be applied to particular still image capturing methods such as panning.

Second Embodiment

Figure 7:
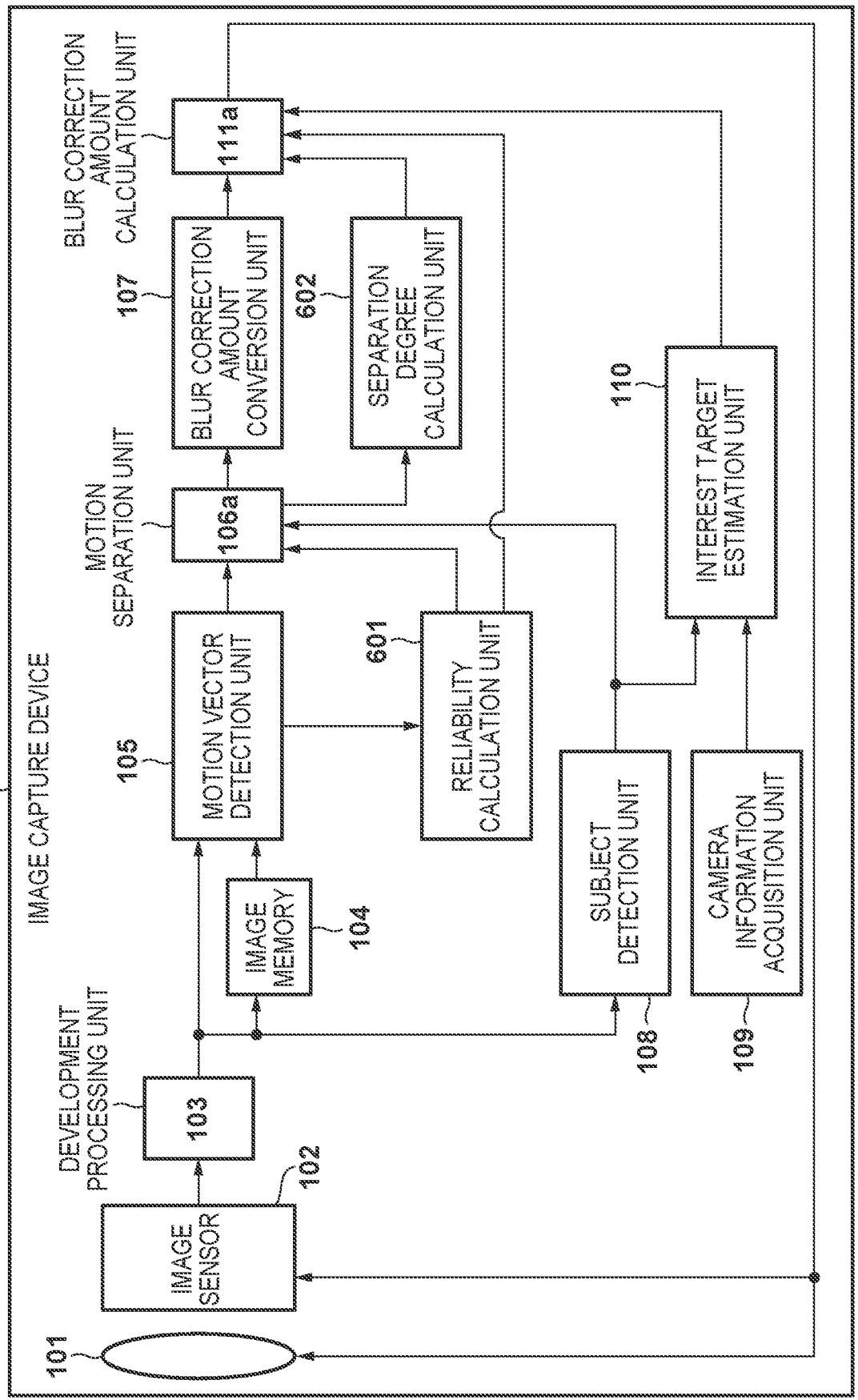
FIG. 7 is a block diagram illustrating the configuration of an image capture device according to a second embodiment.

FIG. 7 is a diagram illustrating the configuration of an image capture device 600 according to the second embodiment of the disclosure. Components of the configuration illustrated in FIG. 7 that are shared with the configuration illustrated in FIG. 1 are denoted with the same reference sign and descriptions thereof are omitted. The image capture device of the present embodiment has the configuration illustrated in FIG. 1 and also includes a reliability calculation unit 601 and a separation degree calculation unit 602. Only units of the present embodiment that execute processing different from that executed in the first embodiment will be described.

In the first embodiment, the blur correction amount is calculated corresponding to the degree of interest toward the background and the main subject. However, depending on the scene being captured, motion detection and motion separation can be difficult even when there is a high degree of interest. For example, motion detection is difficult in the case of a low contrast sky or soft bodies and fluids that drastically change shape between frames. Also, when the amount of motion in the same subject is different or there is difference in depth, motion separation of the background and the main subject can be difficult. In such cases, simply calculating the blur correction amount using just the degree of interest can conceivably result in incorrect blur correction and instability.

In light of this, in the present embodiment, in addition to "the degree of interest of the background and the main subject", "motion detection reliability" and "motion separation degree" are also considered. This method for more stably executing blur correction will now be described.

The differences between the present embodiment and the first embodiment are that: an output result of the reliability calculation unit 601 is used in a motion separation unit 106a, and output results of the reliability calculation unit 601 and the separation degree calculation unit 602 are used in a blur correction amount calculation unit 111a.

The reliability calculation unit 601 calculates a reliability for a motion vector input from the motion vector detection unit 105. The separation degree calculation unit 602 calculates a separation degree of a background vector and a subject vector input from the motion separation unit 106a.

Figure 8:
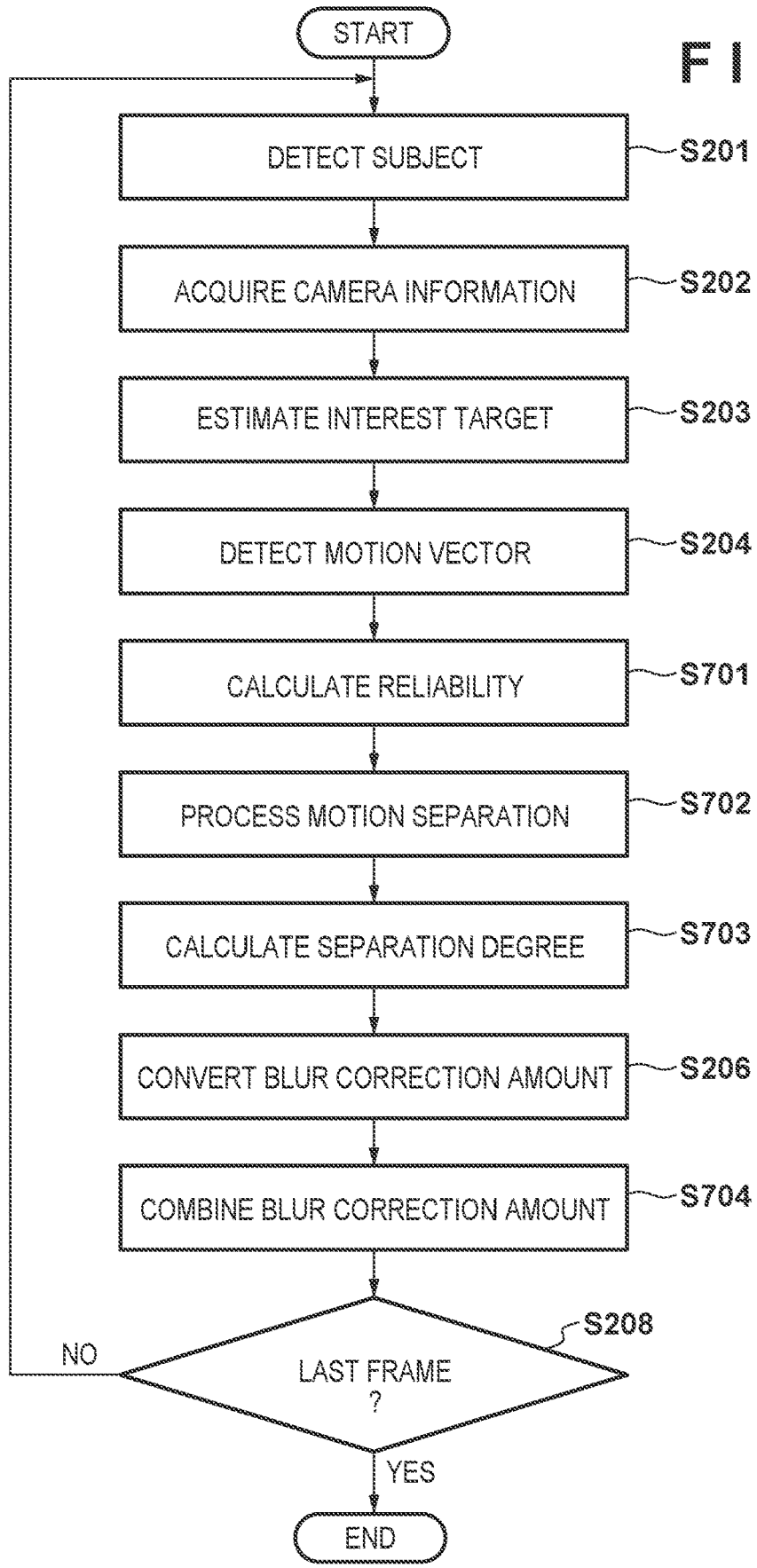
FIG. 8 is a flowchart for describing the processing executed in the second embodiment.

FIG. 8 is a flowchart illustrating the image blur correction operation of the second embodiment. The steps illustrated in FIG. 8 that are the same as the steps illustrated in FIG. 2 are denoted with the same reference sign and descriptions thereof are omitted.

In step S701, the reliability calculation unit 601 calculates the reliability of a motion vector obtained in step S204.

Figure 9:
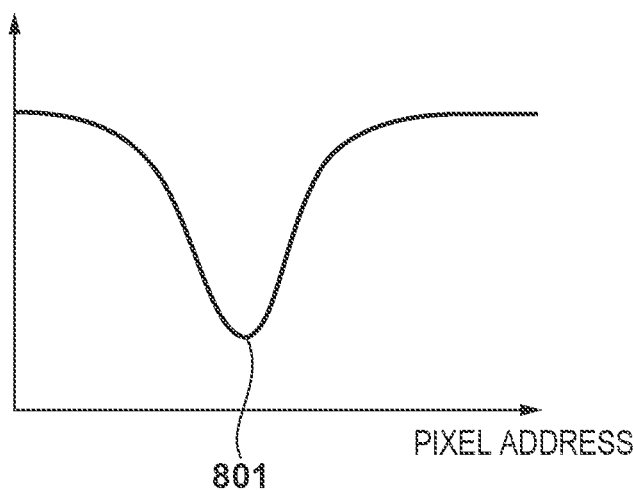
FIG. 9 is a diagram for describing a method of representing a correlation value map.

To calculate the reliability of the motion vector, a two-dimensional correlation value map is used. The two-dimensional correlation value map of FIG. 5B is represented one-dimensionally in FIG. 9 by arranging the correlation values in raster order as indicated by an arrow 404. In FIG. 9, the vertical axis is the correlation value and the horizontal axis is the pixel address uniquely defined by an X coordinate and a Y coordinate in the correlation value map. This expression in FIG. 9 will be used below to calculate the reliability of motion vectors as described below. Note that point 801 indicates a position corresponding to the minimum value in FIG. 5.

FIGS. 10A to 10D are diagrams illustrating examples of an index of a correlation value indicative of the reliability of a motion vector. The horizontal axis in FIGS. 10A to 10D indicates the pixel address, and the vertical axis indicates the correlation value.

Figure 10A:
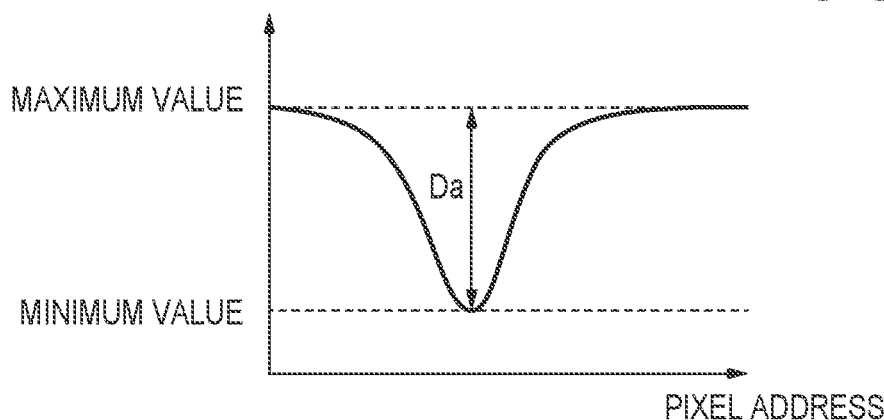
FIGS. 10A to 10D are diagrams for describing correlation value indices indicative of motion vector reliability.

In FIG. 10A, a difference Da between the minimum value and the maximum value of a correlation value is used as an index. Da indicates the range of a correlation value map, and when Da is small, it is conceivable that the contrast of texture is low, indicating low reliability.

Figure 10B:
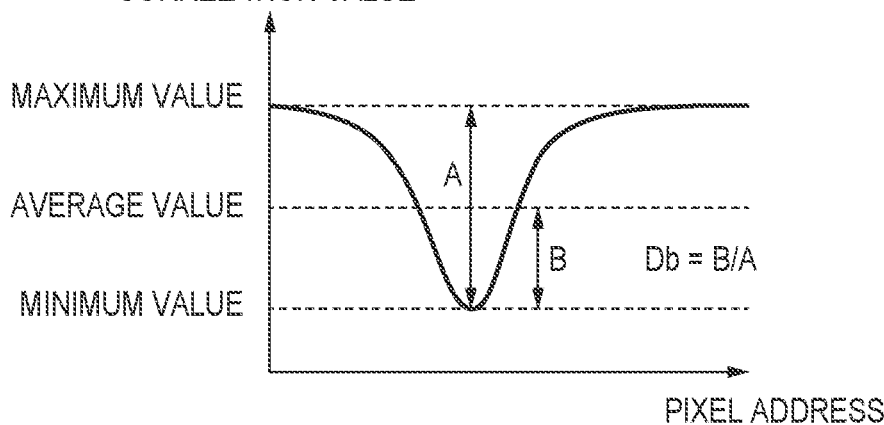

In FIG. 10B, a ratio Db (=B/A) of a difference B between the minimum value and the average value to a difference A between the minimum value and the maximum value of a correlation value is used as an index. Db indicates the steepness of a correlation value peak, and when Db is small, it is conceivable that the similarity between a template area and a search area is low, indicating low reliability.

Figure 10C:
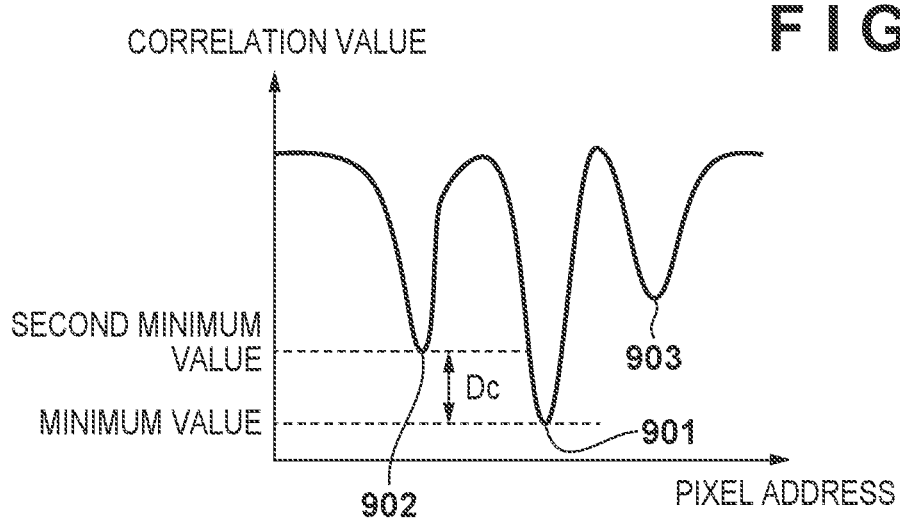

In FIG. 10C, a difference Dc between the minimum value and the second minimum value of a correlation value is used as an index. Here, points 901, 902, 903 respectively correspond to correlation values 401, 402, 403 in FIG. 5. Thus, FIG. 10C indicates confirming whether or not there is a minimum value that is similar to the smallest correlation value, on a contour line in FIG. 5B.

Dc indicates the periodicity of the correlation value map, and when Dc is small, it is conceivable that the texture is a repeated pattern, an edge, or the like, indicating low reliability. Note that here, the minimum value and the second minimum value are selected, but it is sufficient that the periodicity of the correlation value map can be determined, and thus another minimum value may be selected.

Figure 10D:
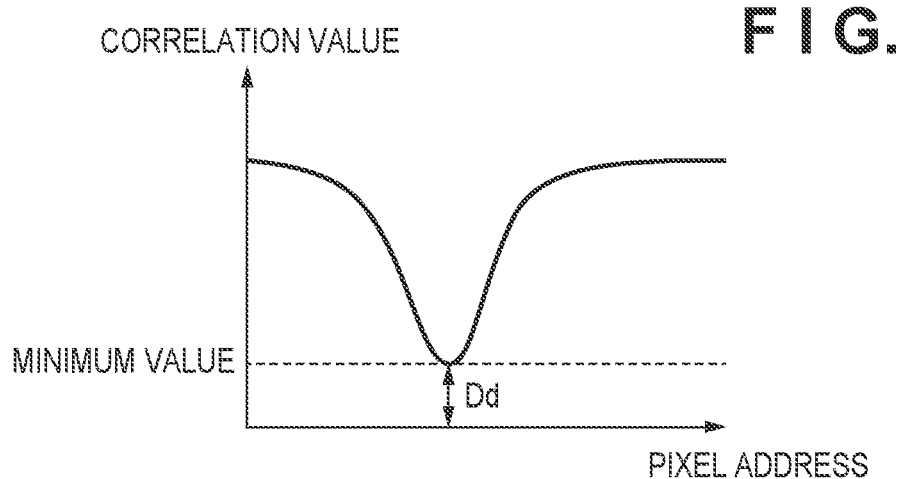

In FIG. 10D, a minimum value Dd of a correlation value is used as an index. When Dd is large, it is conceivable that the similarity between a template area and a search area is low, representing low reliability. Dd and the reliability are inversely proportional to each other, and thus the reciprocal (1/Dd) of Dd is set as an index.

Figure 11:
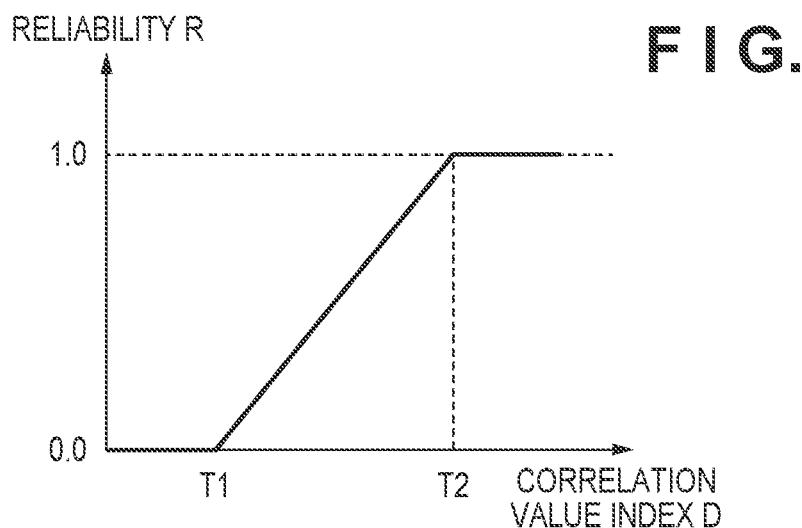
FIG. 11 is a diagram for describing a method of calculating motion vector reliability.

The index of a correlation value described above can be used as a reliability as is. However, a correlation value index and a reliability may be associated with each other as illustrated in FIG. 11, for example. In FIG. 11, the horizontal axis indicates correlation value index (any of Da, Db, Dc, 1/Dd described above), and the vertical axis indicates reliability. In this example, two threshold values T1 and T2 are provided. When the correlation value index is equal to or less than T1, the reliability is 0, and when equal to or greater than T2, the reliability is 1. The threshold values may be changed for each correlation value index. In addition, in the section between the threshold values T1 and T2, correlation value indices and reliabilities may be associated linearly or nonlinearly. In the following description, reliabilities obtained from correlation value indices are respectively expressed as Ra, Rb, Rc, Rd. Here, relationships of Ra=f (Da), Rb=f(Db), Rc=f(Dc), Rd=f(Dd) are adopted.

It is sufficient that a final reliability R of motion vectors is calculated by combining these Ra, Rb, Rc, and Rd. Here, a combination method using weighting addition and logic operation will be described.

In this example of combination using weighting addition, the weights of Ra, Rb, Rc, and Rd are Wa, Wb, Wc, and Wd, respectively, and the reliability R is calculated via Formula (5).

$$R = Wa \times Ra + Wb \times Rb + Wc \times Rc + Wd \times Rd \quad (5)$$

In this example, for weighting, Wa is 0.4, Wb is 0.3, Wc is 0.2, and Wd is 0.1. When all of the reliabilities are sufficiently high and Ra=Rb=Rc=Rd=1 is true, R equals 1.0 according to Formula (5). Also, when Ra equals 0.6, Rb equals 0.5, Rc equals 0.7, and Rd equals 0.7, R equals 0.6 according to Formula (5).

In this example of combination using a logic operation, the threshold values for Ra, Rb, Rc, and Rd are Ta, Tb, Tc, and Td, respectively, the reliability R is calculated via Formula (6) using a logical product, for example.

$$R = (Ra \geq Ta) \wedge (Rb \geq Tb) \wedge (Rc \geq Tc) \wedge (Rd \geq Td) \quad (6)$$

Here, $\wedge$ is a symbol that indicates a logical product. When all of Ra≥Ta, Rb≥Tb, Rc≥Tc, and Rd≥Td hold true, R equals 1 (high reliability), and otherwise R equals 0 (low reliability).

In addition, calculation may be performed using a logical sum as in Formula (7).

$$R = (Ra < Ta) \downarrow (Rb < Tb) \downarrow (Rc < Tc) \downarrow (Rd < Td) \quad (7)$$

Here, $\downarrow$ is a symbol that indicates a negative logical sum. When none of Ra<Ta, Rb<Tb, Rc<Tc, and Rd<Td hold true, R equals 1 (high reliability), and otherwise R equals 0 (low reliability).

In step S702, the motion separation unit 106a separates the motion vectors detected in step S204 into background vectors and subject vectors using the reliability calculated in step S701.

The difference with step S205 is that all of the motion vectors with a reliability less than a predetermined threshold are removed from the start. Motion vectors with a low reliability have a high probability of incorrect detection and a high probability of being incorrectly motion separated and are thus not used. After the motion vectors with low reliability are removed, the same motion separation processing of step S205 is executed.

Figure 12A:
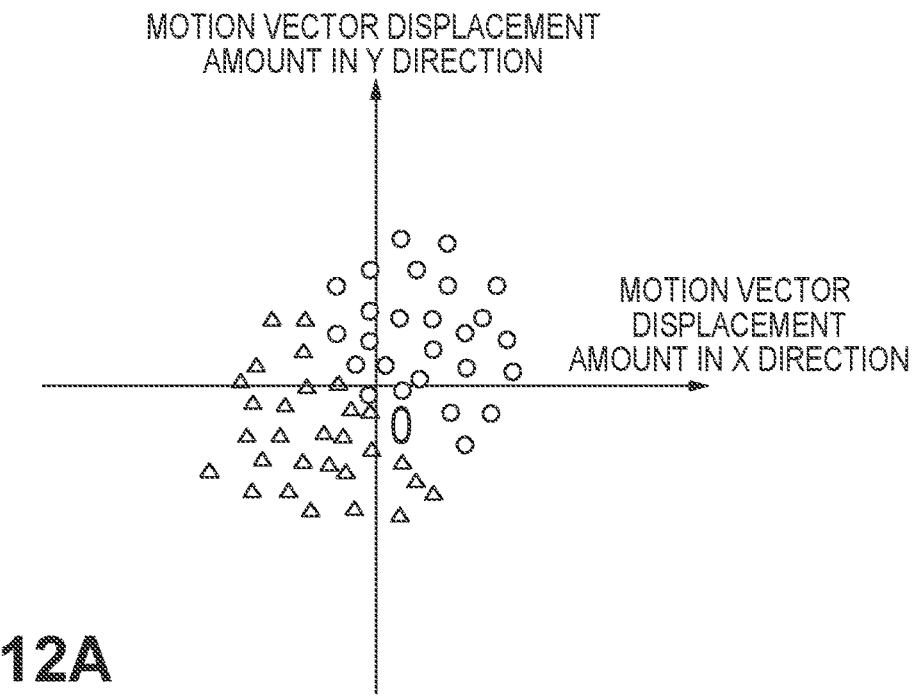
FIGS. 12A and 12B are diagrams for describing an example of motion separation with a low separation degree.
Figure 12B:
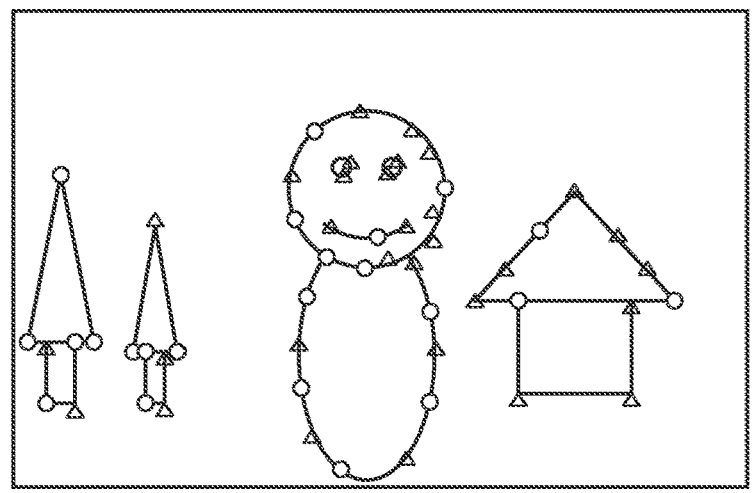

In step S703, the separation degree calculation unit 602 calculates a separation degree U indicative of the separation degree between the background vector and the subject vector separated in step S702. FIGS. 6A and 6B illustrate an example in which the separation degree is high. FIGS. 12A and 12B illustrate an example in which the separation degree is low.

In an example of a method of calculating the separation degree, a variance S of the starting point (i.e., feature point) coordinates of the subject vector is used. In the case in which a subject with a specific motion with a separated subject vector is being captured, the variance S is known to have a characteristic that is constant over a change in time. Thus, as illustrated in FIG. 13 for example, in calculating, when a displacement amount δS between frames of the variance S is large, the separation degree U is low.

Figure 13:
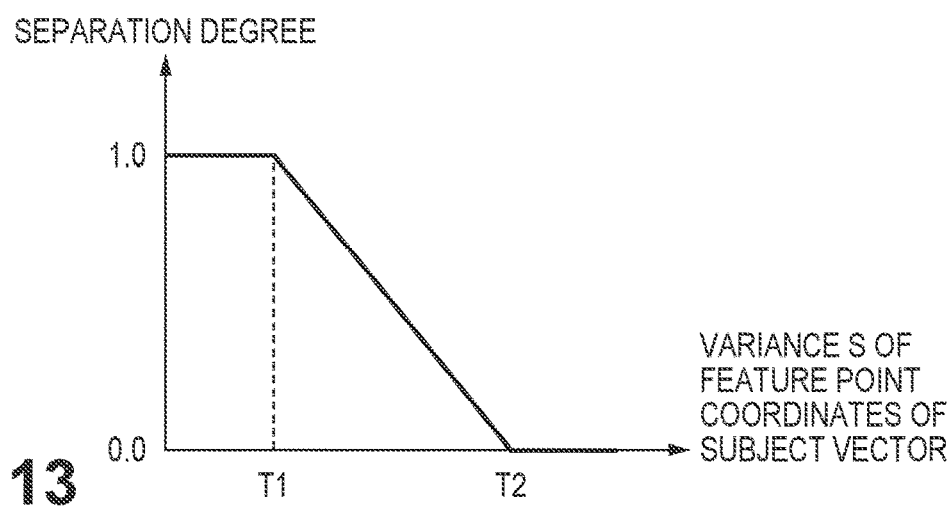
FIG. 13 is a diagram for describing a method of calculating motion separation degree.

In FIG. 13, the horizontal axis indicates the displacement amount δS between frames of the variance S and the vertical axis indicates the separation degree U. In this example, two thresholds T1 and T2 are provided. When δS is a low value equal to or less than the threshold T1, as described above, it can be considered that the specific subject motion is separated from the background, and the separation degree U is 1. However, when δS is a high value equal to or greater than the threshold T2, it can be considered that the specific subject motion is not separated from the background, and the separation degree U is 0. In the section between the threshold values T1 and T2, δS and the separation degree U may be associated linearly or nonlinearly.

In step S704, the blur correction amount calculation unit 111a combines the hand shake correction amount and the subject shake correction amount obtained in step S206 on the basis of the target of interest obtained in step S203, the reliability of the motion vector obtained in step S701, and the motion separation degree obtained in step S703 and generates a final blur correction amount.

The difference with step S207 is that the reliability of the motion detection and the motion separation degree are reflected in the combination ratio of the blur correction amount. The total value of the background vector and the subject vector are RA and RB respectively, and the separation degree is represented by U. An example of a conceivable reflection method is a method of calculating the blur correction amount via Formula (8) below.

$$H = A \cdot RA \cdot (1-U) \cdot H0 / \{A \cdot RA \cdot (1-U) + (1-A) \cdot RB \cdot U\} + (1-A) \cdot RB \cdot U \cdot H1 / \{A \cdot RA \cdot (1-U) + (1-A) \cdot RB \cdot U\} \quad (8)$$

According to Formula (8), when a reliability RA of the background vector is higher than a reliability RB of the subject vector, the ratio of background blur correction is increased. Also, when the separation degree U is high, the ratio of subject shake correction is increased.

As described above, in the present embodiment, in addition to "the degree of interest of the background and the main subject", "motion vector detection reliability" and "motion separation degree" are also considered. This method can obtain an effect of blur correction being stably executed more than the first embodiment.

Third Embodiment

Figure 14:
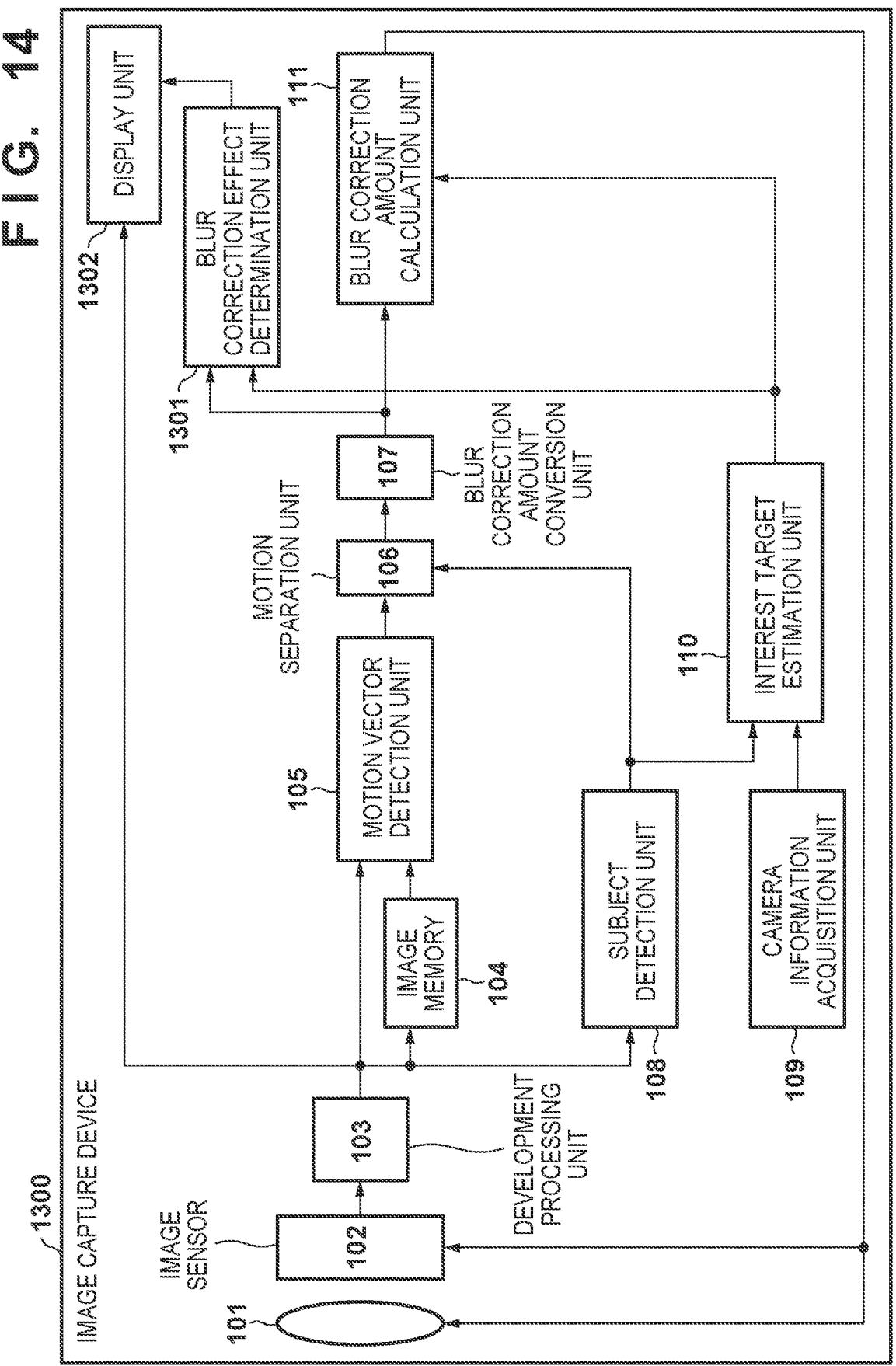
FIG. 14 is a block diagram illustrating the configuration of an image capture device according to a third embodiment.

FIG. 14 is a diagram illustrating the configuration of an image capture device 1300 according to the third embodiment of the disclosure. Components of the configuration illustrated in FIG. 14 that are shared with the configuration illustrated in FIG. 1 are denoted with the same reference sign and descriptions thereof are omitted. The image capture device of the present embodiment has the configuration illustrated in FIG. 1 and also includes a blur correction effect determination unit 1301 and a display unit 1302. Only units of the present embodiment that execute processing different from that executed in the first embodiment will be described.

In the first embodiment, depending on the target of interest of the user, the correction ratio between hand shake and subject shake is controlled. However, when the blur amount of hand shake and subject shake are roughly equal, the user cannot know which blur correction effect is in effect. It is standard for cameras in recent years to have a hand shake correction function. However, many cameras do not have a subject shake correction function. Thus, though users are familiar with hand shake correction, many users are not familiar with subject shake correction. Thus, it is very important to clearly inform these users when subject shake correction is in effect.

In light of this, in the present embodiment, a method of determining a state in which a subject shake correction effect is significant and notifying the user of this state will be described.

The difference between the present embodiment and the first embodiment is that the blur correction effect determination unit 1301 determines the effect of subject shake correction using the output of the interest target estimation unit 110 and the blur correction amount conversion unit 107 and the display unit 1302 notifies the user of the determination result.

The blur correction effect determination unit 1301 determines the effect of subject shake correction on the basis of information of the target of interest obtained by the interest target estimation unit 110 and a hand shake correction amount and a subject shake correction amount obtained from the blur correction amount conversion unit 107. The display unit 1302 displays image data obtained from the development processing unit 103 and the determination result of a blur correction effect input from the blur correction effect determination unit 1301.

Figure 15:
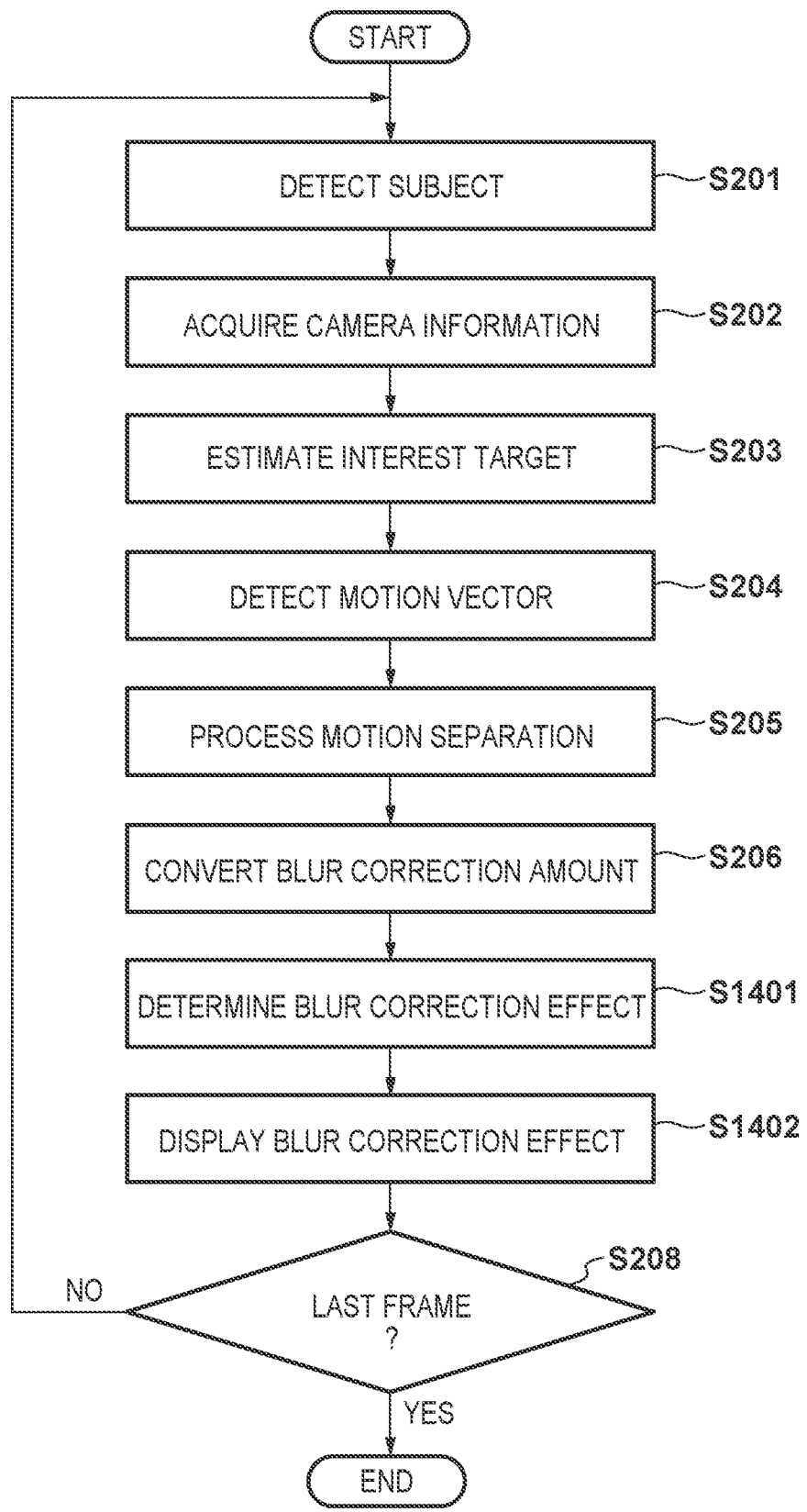
FIG. 15 is a flowchart for describing the processing executed in the third embodiment.

FIG. 15 is a flowchart illustrating the processing operation according to the third embodiment. The steps illustrated in FIG. 15 that are the same as the steps illustrated in FIG. 2 are denoted with the same reference sign and descriptions thereof are omitted.

In step S1401, the blur correction effect determination unit 1301 uses the target of interest obtained in step S203 and/or the hand shake correction amount and subject shake correction amount obtained in step S206 and determines the effect of subject shake correction.

An example of a method of determining the effect of subject shake correction includes determining the effect of subject shake correction to be high when the subject degree indicative of the degree in which the target of interest is a subject is high or when the absolute value of the difference between the hand shake correction amount and the subject shake correction amount is large. Note that subject degree and the absolute value of the difference and the height of the effect of correction may have a non-linear relationship. Also, when the subject degree is equal to or greater than a predetermined value, the effect of subject shake correction may be determined to be higher than when the subject degree is less than the predetermined value and, when the absolute value of the difference between the hand shake correction amount and the subject shake correction amount is equal to or greater than a predetermined value, the effect of subject shake correction may be determined to be high.

As information for determining the effect of subject shake correction, the reliability of the subject information, the reliability of the subject vector, the separation degree of the background vector and the subject vector, and the upper limit of the blur correction amount may also be used.

The reliability of the subject information is the reliability of the subject information obtained from the subject detection unit 108. When the specific subject is the face of a person, the reliability of face detection can be used. When the reliability of the subject information is low, the subject shake correction may not correctly work. Thus, in the case of subject information of high reliability, the effect of subject shake correction is determined to be higher than in the case of subject information of low reliability.

The reliability of the subject vector can be obtained from the reliability calculation unit 601 as mentioned when describing the second embodiment. When the reliability of the subject vector is low, the subject shake correction may not correctly work. Thus, in the case of a subject vector of high reliability, the effect of subject shake correction is determined to be higher than in the case of a subject vector of low reliability.

The separation degree of the background vector and the subject vector can be obtained from the separation degree calculation unit 602 as mentioned when describing the second embodiment. When the separation degree of the background vector and the subject vector is low, the subject shake correction may not correctly work. Thus, in the case of a high separation degree of the background vector and the subject vector, the effect of subject shake correction is determined to be higher than in the case of a low separation degree of the background vector and the subject vector.

The upper limit of the blur correction amount is an upper limit of the blur amount that an optical blur correction unit or an electronic blur correction unit, such as those mentioned above, is capable of correcting. In the case of an optical blur correction unit, the upper limit is determined by the movable range of the correction lens or the image sensor in the optical system. In the case of electronic blur correction, the upper limit is determined by the size of the surplus pixel area provided around the output area of the image. When the subject shake correction amount is greater than the upper limit of the blur correction amount, the subject shake correction may not correctly work. Thus, when the value obtained by subtracting the subject shake correction amount from the upper limit of the blur correction amount is large, the effect of subject shake correction is determined to be higher than when the value is low.

The effect of subject shake correction is determined on the basis of the plurality of pieces of information described above. The method of determining from the plurality of pieces of information is similar to the method of estimating the target of interest via Formula (2) described above and thus description thereof will be omitted. When the final value indicative of the effect subject shake correction is larger than a predetermined threshold, an effect of subject shake correction is determined to be present, and when the value is equal to or less than the predetermined threshold, an effect of subject shake correction is determined to not be present. To prevent the determination result frequently switching, the determination result is switched after the state in which the value is larger than or smaller than the predetermined threshold has continued for a predetermined amount of time or more.

Next, in step S1402, the display unit 1302 displays image data obtained from the development processing unit 103 and the determination result of a blur correction effect obtained in step S1401. Display items, such as text and icons, are displayed, but no such limitation is intended.

Figure 16A:
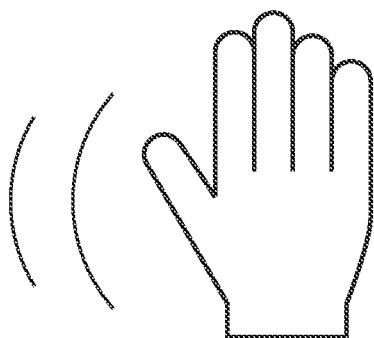
FIGS. 16A and 16B are diagrams for describing display items relating to image blur correction.
Figure 16B:

FIGS. 16A and 16B illustrate examples of display items corresponding to determination result of blur correction effect. FIG. 16A illustrates an icon (hereinafter, referred to as a hand shake correction icon) indicative of hand shake correction being in effect. FIG. 16B illustrates an icon (hereinafter, referred to as a subject shake correction icon) indicative of subject shake correction being in effect.

For example, when an effect of subject shake correction is determined to be not present in step S1401, a display unit 1402 displays the hand shake correction icon of FIG. 16A in a specific section on the screen. When an effect of subject shake correction is determined to be present in step S1402, the display unit 1402 displays the subject shake correction icon of FIG. 16B in a specific section on the screen. By switching between the display items in this manner, the user can clearly identify between the state in which the hand shake correction is in effect and the state in which the subject shake correction is in effect.

A method of displaying the display item will be described below. In hand shake correction, the blur of the entire background is corrected. Thus, typically, the hand shake correction icon is displayed in a fixed position on the screen. However, in subject shake correction, the blur of a specific subject is corrected, and there may be not only one subject on the screen. Thus, the subject shake correction icon should have a display method different from that for a typically hand shake correction icon.

Figure 17A:
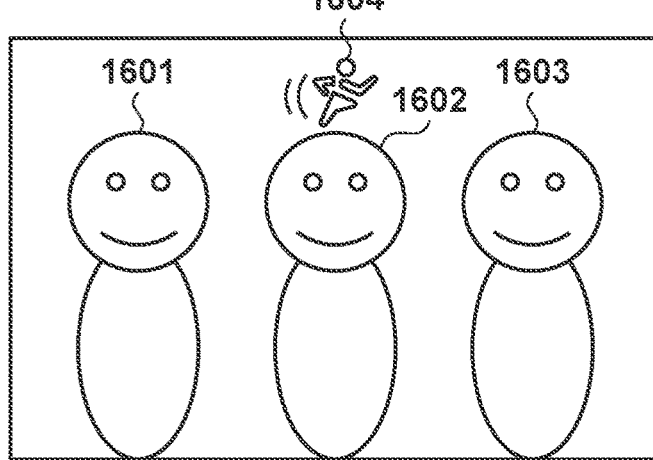
FIGS. 17A to 17C are diagrams for describing a method of displaying display items relating to image blur correction.
Figure 17B:
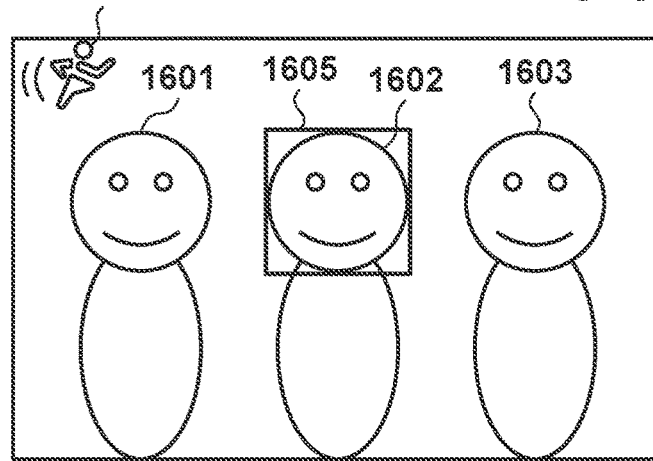
Figure 17C:
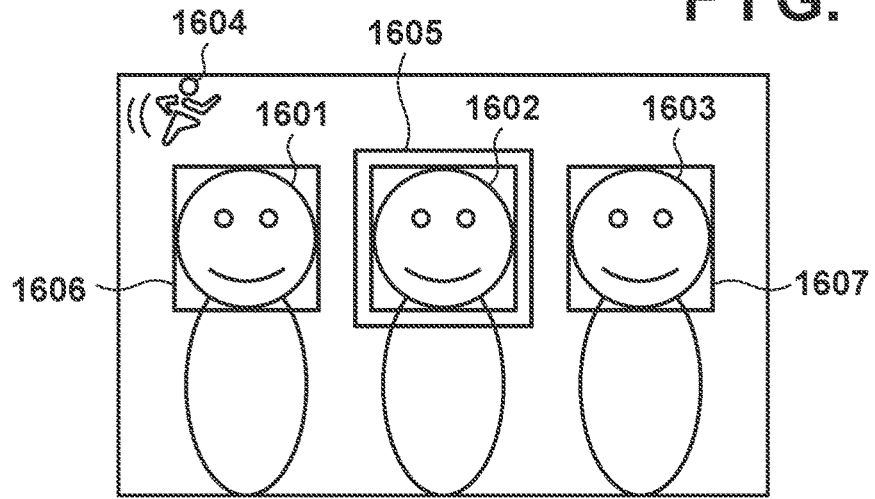

FIGS. 17A to 17C illustrate examples of a method of displaying a subject shake correction icon. In FIGS. 17A to 17C, three persons (1601, 1602, 1603) are present as subjects on the screen. In this example, the target (blur correction target) of the subject shake correction is the person 1602 centrally positioned on the screen.

In FIG. 17A, a subject shake correction icon 1604 is displayed near the person 1602 who is the subject shake correction target. The user can be informed that the person 1602 is being corrected for subject shake by dynamically changing the display position of the subject shake correction icon in this manner.

In FIG. 17B, the subject shake correction icon 1604 is displayed at a fixed position in the upper left of the screen. A detection frame 1605 of the person 1602 is displayed on the person 1602 who is the target of subject shake correction. In this manner, the user can be informed that the person 1602 is being corrected for subject shake by a combination of the subject shake correction icon and a detection frame of the subject. Note that the detection frame of the subject may surround one of the parts of the subject such as the face or may surround the entire subject.

In FIG. 17C, a detection frame 1606 for the person 1601, a detection frame 1605 for the person 1602, and a detection frame 1607 for the person 1603 are illustrated. Here, only the detection frame 1605 of the person 1602 who is the subject shake correction target is displayed with a different design to the other detection frames 1606, 1607. In this example, the detection frame 1605 has a double line to distinguish it from the other detection frames. In other examples, the detection frame 1605 may be distinguished from the other detection frames by having a different color, shape, or size. By changing the design of the subject detection frame in this manner, the user can be informed that the person 1602 is being corrected for subject shake.

As described above, in the present embodiment, an effect is obtained more so than in the first embodiment of being able to clearly notify the user of a state in which the effect of subject shake correction is significantly in effect.

Fourth Embodiment

The present embodiment, which is a mode with improved compatibility between effective use of correction stroke and blur correction performance, will now be described.

Figure 18:
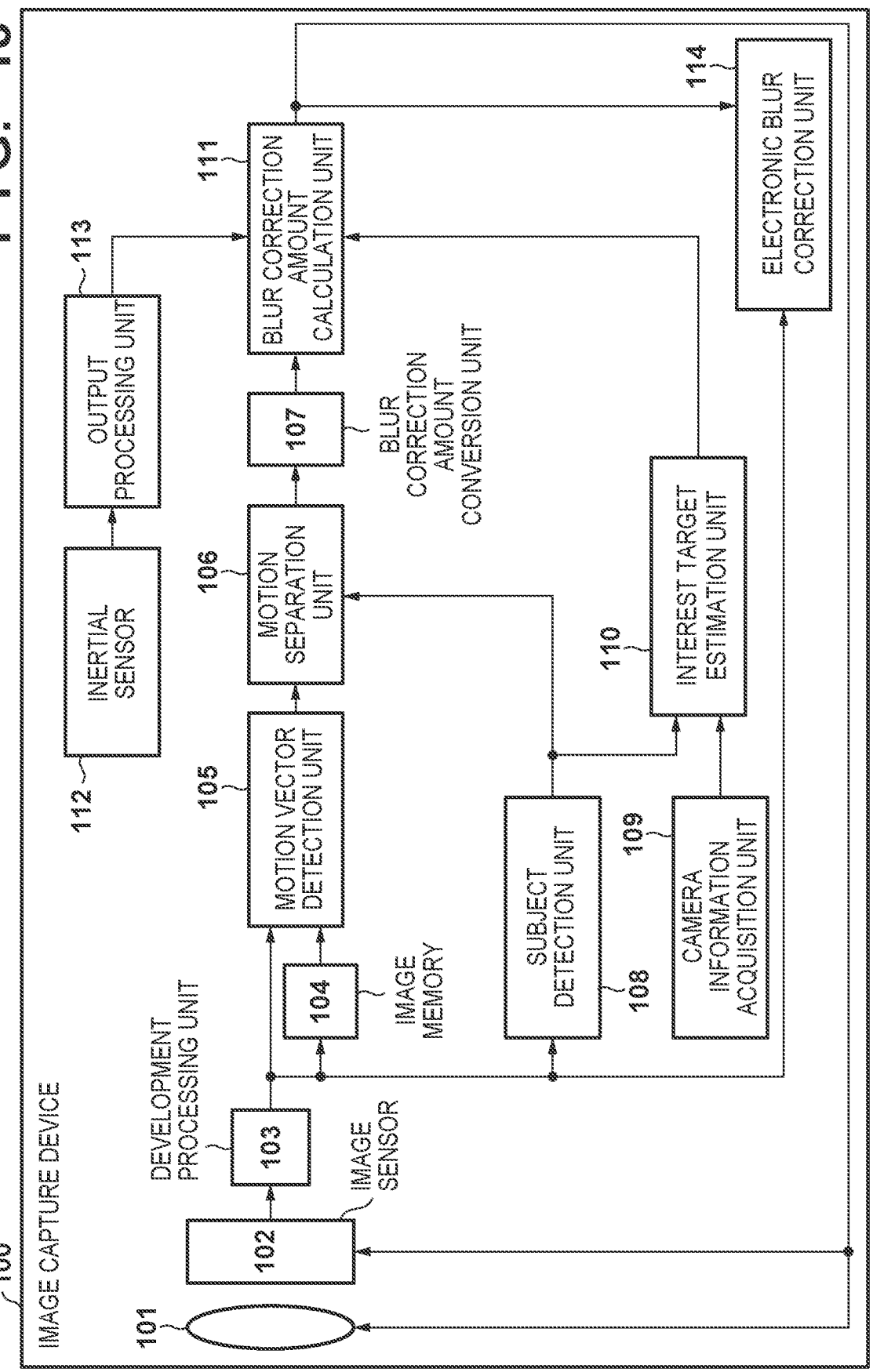
FIG. 18 is a block diagram illustrating the configuration of an image capture device according to a fourth embodiment of the disclosure.

FIG. 18 is a diagram illustrating the configuration of an image capture device according to the fourth embodiment of the disclosure. Description of configurations shared with the image capture device according to the first embodiment illustrated in FIG. 1 will be omitted.

As illustrated in FIG. 18, an inertial sensor 112 is a sensor that detects the shake of the image capture device 100 and may be an angular velocity sensor or the like. An output processing unit 113 converts an output signal of the inertial sensor (hereinafter, referred to as an angular velocity sensor) 112 to a third blur correction amount. The blur correction amount calculation unit 111 generates an optical blur correction amount and an electronic blur correction amount by using the first blur correction amount, the second blur correction amount obtained by the blur correction amount conversion unit 107 and the third blur correction amount obtained by the output processing unit 113 on the basis of the information of the target of interest obtained by the interest target estimation unit 110. The generated optical blur correction amount is output to a shift mechanism that shifts a correction lens and/or the image sensor 102 in the optical system 101, which are optical blur correction units, in a direction perpendicular to the optical axis and optical blur correction is performed. Also, the generated electronic blur correction amount is output to an electronic blur correction unit 114, and electronic blur correction is performed to control the position of the subject to bring it near a predetermined position.

Next, image blur correction operation in the image capture device 100 configured as described above will be described using the flowchart illustrated in FIG. 19. Steps S201 to S205 and step S208 are the same as in the first embodiment. Thus, these steps will only be described in regard to the flow.

In step S201, the subject detection unit 108 detects a specific subject from image data input from the development processing unit 103 and outputs subject information.

In step S202, the camera information acquisition unit 109 acquires camera information required to estimate the image-capturing state.

In step S203, the interest target estimation unit 110 estimates whether the user's interest is targeted on the background or a subject on the basis of the subject information detected in step S201 and the camera information acquired in step S202.

In step S204, the motion vector detection unit 105 detects, via template matching, a motion vector in the image data input from the development processing unit 103 and the image memory 104.

In step S205, the motion separation unit 106 separates the motion vectors detected in step S204 into background vectors and subject vectors.

In step S1906, the blur correction amount conversion unit 107, as in step S206 of FIG. 2, converts the background vector to the first blur correction amount (hereinafter, referred to as the hand shake correction amount) and the subject vector to the second blur correction amount (hereinafter, referred to as the subject shake correction amount). Also, concurrent to this, the output processing unit 113 converts the output signal of the angular velocity sensor 112 to the third blur correction amount. Note that in the output processing unit 113, after an offset component is removed from the output signal of the angular velocity sensor 112, integration processing is executed and the angular velocity information is converted to a displacement amount on the imaging surface. This is then converted to the third blur correction amount able to cancel the blur by taking the value with the opposite sign.

In step S1907, the blur correction amount calculation unit 111 obtains the hand shake correction amount and the subject shake correction amount from the first, second, and third blur correction amount obtained in step S1906 on the basis of the target of interest obtained in step S203. Also, by combining the hand shake correction amount and the subject shake correction amount, the blur correction amount is generated.

Note that the second blur correction amount calculated from the subject vector can be used as is as the subject shake correction amount. The hand shake correction amount is obtained using the first blur correction amount calculated from the background vector and the third blur correction amount calculated from the information of the angular velocity sensor 112. This method typically uses frequency division.

The third blur correction amount has a short sample period and is good for detecting high frequency blur. However, detection errors caused by an offset error or drift of the angular velocity sensor occur in low frequency regions. These errors at greater at higher temperatures. The first blur correction amount has a long sample period and is not good for detecting high frequency blur. Also, detection errors caused by an offset error or drift do not occur. However, in dark places, the signal-to-noise (SN) ratio of the image sensor 102 decreases, making errors likely to occur.

Here, filter processing is executed using a low-pass filter and a high-pass filter with a cut-off frequency of approximately 1 Hz. The output from applying the low-pass filter to the first blur correction amount and the output from applying the high-pass filter on the third blur correction amount are added together, and the result is taken as the hand shake correction amount. Also, at high temperatures, the output from applying the low-pass filter to the first blur correction amount may be taken as the hand shake correction amount, and in dark places, the output from applying the high-pass filter on the third blur correction amount may be taken as the hand shake correction amount.

The method of combining the hand shake correction amount and the subject shake correction amount in step S1907 is similar to that in step S207 of FIG. 2, and thus a detailed description thereof will be omitted. For example, the final, post-combination blur correction amount H can be acquired using Formula (4) described above.

In step S1909, the post-combination blur correction amount H calculated in step S1907 is allocated to a correction lens, a shift mechanism of an image sensor, or an image cutout and blur correction control to correct blur in an image is executed. This blur correction control is executed by outputting a blur correction control signal to the correction lens and the shift mechanism of the image sensor and driving them. Also, at the same time, electronic blur correction is executed by outputting a control signal to the electronic blur correction unit 114, cutting out a portion of the image signal output from the development processing unit 103 and executing control (electronic blur correction control) of an image cutout position where a new image signal is generated. Then, an output image from the image sensor 102 is sent to a non-illustrated image signal recording unit or image display unit.

Finally, in step S208, the image capture device 100 determines whether or not the process has been completed up to the last frame. In the case in which the process has been completed up to the last frame, the process is ended. In the case in which the process has not been completed, the process returns to step S201.

Here, the blur correction control of step S1909 will be further described.

Even in cases in which blur caused by typical hand shake and subject shake can be corrected, there are cases in which the main subject moves greatly on the screen, such as when the user pans slowly relative to the high-speed movement of the subject or when the main subject (correction target) is temporarily hidden by another subject. In such cases, if the correction target (main subject) is continuously kept at a predetermined position on the screen, the correction stroke is insufficient, resulting in the blur of the correction target being unable to be corrected.

In light of this, in the present embodiment, to enable both a resolution of correction stroke insufficiency and subject blur correction, a correction limiter is not simply applied when the end of the correction stroke is reached. Instead, when the main subject (correction target) moves greatly, this motion is allowed to a certain degree and, corresponding to the remaining amount of correction stroke, a filter with a high pass effect is applied to the correction amount and a correction signal with emphasis placed on high frequency blur correction is generated. Also, the output gain is varied.

The method of generating the blur correction control signal will be described below. Note that in the example described below, to facilitate understanding, blur correction is executed for only one axis. However, a plurality of correction axes exist and blur correction is executed by executing control in a similar manner for all axes. Also, a correction unit can be allocated for each axis, and, for example, a method may be used in which all of the blur correction for the roll direction is executed by the shift mechanism of the image sensor and the blur correction for the pitch direction and the yaw direction is executed by the correction lens.

Figure 20A:
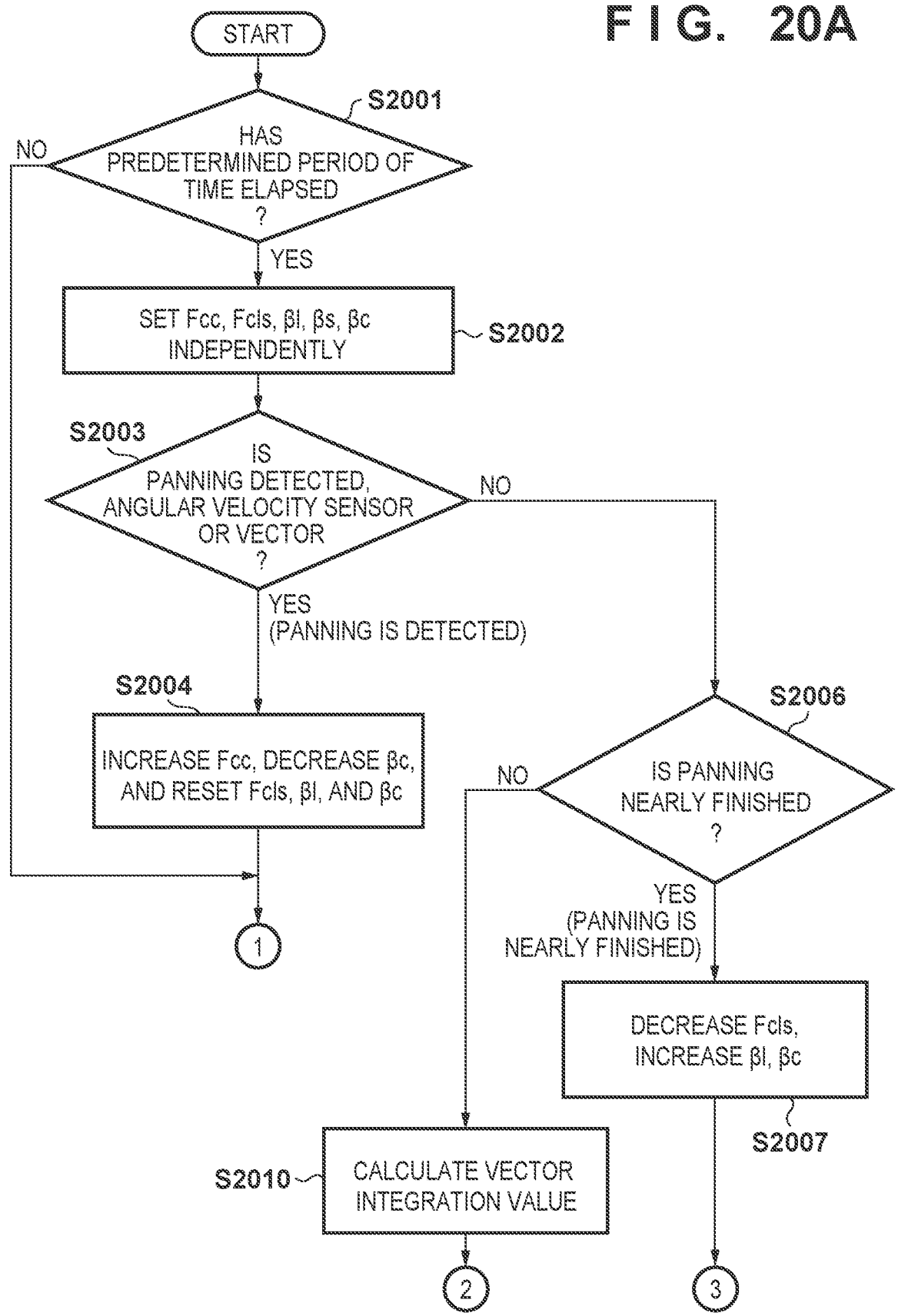
FIGS. 20A and 20B are diagrams for describing the operation of obtaining a coefficient and a gain of a high-pass filter.
Figure 20B:
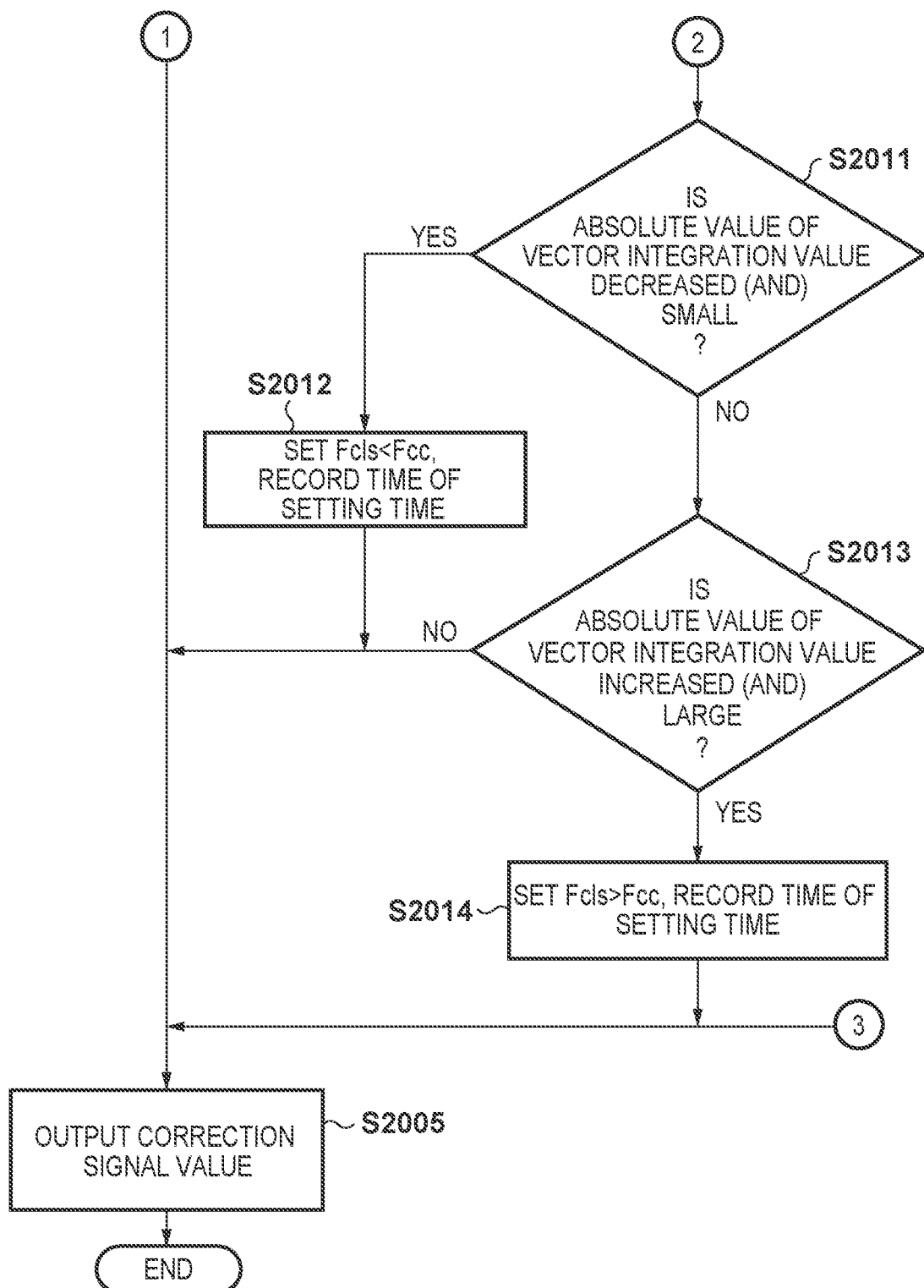

The method of generating the blur correction control signal will be described below using FIGS. 20A and 20B.

In step S2001, whether or not a predetermined amount of time has elapsed since a coefficient Fc and a gain β of the high-pass filter applied to the blur correction amount were obtained is determined. This is performed by determining whether or not the difference between the time when the coefficient Fc and the gain β were set in step S2012 or step S2013 and the current time is equal to or greater than a predetermined amount of time. When an amount of time equal to or greater than the predetermined amount of time has elapsed, the process proceeds to step S2002. When an amount of time less than the predetermined amount of time has elapsed, the process proceeds to step S2005.

In step S2002, after the time of the setting time of the coefficient Fc and the gain β is reset, the blur correction amount corrected at the correction lens, the shift mechanism of the image sensor 102, and the electronic blur correction unit 114 is calculated (blur correction amount H allocation processing is executed).

The calculation of the correction amount shared by the mechanisms are executed with settings that ensure that a state does not occur in which correction cannot be executed due to insufficient stroke for blur correction when the correction amount is large. Specifically, a coefficient Fcc and a gain βc of the high-pass filter of the correction amount obtained by control of the image cutout position are set and a coefficient Fcls and gains βl, βs of the correction lens and the shift mechanism of the high-pass filter of the third blur correction amount calculated from the information of the angular velocity sensor 112 are set.

In the case in which the blur correction amount H is small (case 1), the image cutout position is fixed in a central position and the correction lens and the shift mechanism are driven to execute blur correction. This is because optical performance in the central region of the screen is excellent compared to the periphery and there is little shading, allowing an image with higher resolution and no left-right luminance difference to be obtained.

In the case in which the blur correction amount H is increased and the blur correction amount H is close to the maximum amount able to be corrected by the correction lens and the shift mechanism (case 2), by controlling the image cutout position, the correction amount handled by the correction lens and the shift mechanism is reduced and blur correction stroke insufficiently is prevented. This enables good blur correction.

In the case in which the blur correction amount H is further increased (case 3), the coefficient Fcc and the gain βc of the high-pass filter for the correction amount obtained by control of the image cutout position are set. Also, the coefficient Fcls and the gains βl, βs of the high-pass filter of the third blur correction amount calculated from the information of the angular velocity sensor 112 are set. In this way, the sensitivity of blur correction for low frequency shake is reduced, blur correction stroke insufficiently is avoided, and good blur correction is enabled.

Here, in the present embodiment, the coefficient Fcc and the gain βc of the high-pass filter for the correction amount obtained by control of the image cutout position and the coefficient Fcls and the gains βl, βs of the high-pass filter of the third blur correction amount are switched in accordance with the signals of each other. However, in step S2002, first, each individual optimal value is set. A method of individually setting the optimal value of the coefficients Fcc, Fcls and the gains βc, βl, βs of the high-pass filter in step S2002 will be described below.

The third blur correction amount calculated from the correction amount obtained by control of the image cutout position and the information of the angular velocity sensor 112 has the high-pass filter applied to it, and, by changing the coefficients Fcc, Fcls of the high-pass filter, the effect can be changed. Also, by applying the gains βc, βl, βs with a maximum value of 100% to the output, a restriction can be placed on the control level.

A correction amount Hl obtained by control of the correction lens, a correction amount Hs obtained by control of the shift mechanism of the image sensor 102, and a correction amount Hc obtained by control of the image cutout position of the electronic blur correction unit 114 are calculated from the correction amount H as described below.

(Case 1)
In the case of H≤(Hlmax+Hsmax)*αls:

$Hl = H \times Hlmax/(Hlmax+Hsmax)$ $Hs = H \times Hsmax/(Hlmax+Hsmax)$ (Case 2)
In the case of H>(Hlmax+Hsmax)*αls and H≤(Hlmax+Hsmax)*αls+Hcmax*αc:

$Hc = H - (Hlmax+Hsmax)*\alpha ls$ $Hl = Hlmax*\alpha ls$ $Hs = Hsmax*\alpha ls$ (Case 3)
In the case of H>(Hlmax+Hsmax)*αls+Hcmax*αc:

$Hc = Hcmax*\alpha c + Hover*Hcmax/Hmax$ $Hl = Hlmax*\alpha ls/2 + Hover*Hlmax/Hmax$ $Hs = Hsmax*\alpha ls/2 + Hover*Hsmax/Hmax$ However $Hover = H - \{(Hlmax+Hsmax)*\alpha ls + Hcmax*\alpha c\}$ $Hmax = Hlmax + Hsmax + Hcmax$ Note that Hlmax, Hsmax, Hcmax are the maximum value, i.e., the correction stroke, of the correction amount Hl obtained by control of the correction lens, the correction amount Hs obtained by control of the shift mechanism of the image sensor, and the correction amount Hc obtained by control of the image cutout position, respectively. αls, αc are ratios to the correction stroke and are predetermined values used for allocating the final blur correction amount and setting the correction value.

Also, in case 3, depending on the correction amount Hl, the correction amount Hs, and the correction amount Hc, the coefficient Fcc of the high-pass filter of the correction amount Hc obtained by control of the image cutout position, the coefficient Fcls of the high-pass filter of the third blur correction amount, the gain βl of the correction amount Hl, the gain βs of the correction amount Hs, and the gain βc of the correction amount Hc are set. Specifically, they are set as follows.

In the case of Hover being less than Pe1(%) of [Hmax−{(Hlmax+Hsmax)*αls+Hcmax*αc}]:

$Fcc = Fcc1 \text{ (Hz)} > Fcc0 \text{ (Hz)}, \beta c = \beta c1(\%) < 100\%$ $Fcls = Fcls0 \text{ (Hz)}, \beta l = \beta s = 100\%$ In the case of Hover being equal to or greater than Pe1(%) of [Hmax−{(Hlmax+Hsmax)*αls+Hcmax*αc}] and less than Pe2(%):

$Fcc=Fcc2$ (Hz)>$Fcc1$ (Hz),$\beta c=\beta c2$(%)<$\beta c1$(%)

$Fcls=Fcls2$ (Hz)>$Fcls1$ (Hz),$\beta l=\beta s=\beta ls2$(%)<100%

In the case of Hover being equal to or greater than Pe2(%) of [Hmax−{(Hlmax+Hsmax)*αls+Hcmax*αc}]:

$Fcc=Fcc3$ (Hz)>$Fcc2$ (Hz),$\beta c=\beta c3$(%)<$\beta c2$(%)

$Fcls=Fcls3$ (Hz)>$Fcls1$ (Hz),$\beta l=\beta s=\beta ls3$(%)<$\beta ls2$(%)

However, Fcc is the coefficient of the high-pass filter of the correction amount obtained by control of the image cutout position, βc is the gain of the correction amount Hc, Fcls is the coefficient of the high-pass filter of the third blur correction amount, and βl, βs are the gains of the correction amount Hl, correction amount Hs, respectively. Note that Fcc0 (Hz) is the minimum value of the coefficient Fcc of the high-pass filter, and Fcls0 (Hz) is the minimum value of the coefficient Fcls of the high-pass filter.

Also, note that the coefficient and the gain of the high-pass filter in case 1 and case 2 are as follows: Fcc=Fcc0 (Hz) (minimum value), βc=100%, Fcls=Fcls0 (Hz), β1=βs=100%.

Next, the process proceeds to step S2003 where whether or not the image capture device 100 is panning is determined. In the case in which a large blur caused in the start or first half of panning is detected from the output of the angular velocity sensor 112 or the vector detection result of the motion vector detection unit 105, the image capture device 100 is determined to be in a panning state and the process proceeds to step S2004. In the case in which no panning is detected, the process proceeds to step S2006.

In step S2004, the value of the coefficient Fcc of the high-pass filter of the correction amount obtained by control of the image cutout position is increased to increase the ratio of the correction amount of higher frequency. For example, if the value prior to change is Fcc0 (Hz), it is changed to Fcc1 (Hz), if Fcc1 (Hz), it is changed to Fcc2 (Hz), if Fcc2 (Hz) it is changed to Fcc3 (Hz), and if the value prior to change is Fcc3 (Hz), it is not changed.

At the same time, the value of the gain βc of the correction amount obtained by control of the image cutout position is decreased. If the value prior to change is βc=100%, it is changed to βc1(%), if βc1(%), it is changed to βc2(%), if βc2(%), it is changed to βc3(%), and if the value prior to change is βc3(%), it is not changed.

This allows for the suddenly increasing effects of the signal of the angular velocity sensor 112 caused by panning or the like to be decreased.

Also, because the signal of the angular velocity sensor 112 reflects the motion of the camera such as panning, compared to a motion vector that reflects subject motion, the signal is delayed. To reduce the effects of this delay in fast camera movement, on the basis of the coefficient Fcc and the gain βc of the correction amount obtained by control of the image cutout position set at this point in time, the coefficient Fcls for the third correction amount, the gain 0l of the correction amount Hl obtained by the correction lens, and the gain βs of the correction amount Hs obtained by the shift mechanism are reset as indicated in FIG. 21.

If the coefficient Fcc of the correction amount obtained by control of the image cutout position is Fcc1 (Hz) (the gain in this case being βc1), for the coefficient Fcls of the high-pass filter of the third blur correction amount, the cut-off frequency which is the highest between Fcls0 and the current setting value is selected. For the gain β1 of the correction amount Hl obtained by control of the correction lens and the gain βs of the correction amount Hs obtained by control of the shift mechanism, the lowest value between 100% and the current setting value is selected. The same applies to the other cases.

Thereafter, the process proceeds to step S2005, and, in accordance with the set value, a correction control signal is output to the correction lens of the optical system 101, the shift mechanism of the image sensor 102, and the electronic blur correction unit 114 and blur correction is executed.

On the other hand, when the process proceeds from step S2003 to step S2006, whether or not panning is nearly finished is determined. When panning is nearly finished, the process proceeds to step S2007, and when panning is not nearly finished, the process proceeds to step S2010. The determination of whether or not panning is nearly finished is executed by observing a time series of the output of the angular velocity sensor 112 and/or the vector detection result.

When a large blur caused in the start or first half of panning is detected from the output of the angular velocity sensor 112 and the vector detection result, the absolute value of the signal indicative of panning is decreased to a predetermined value or lower and the gradient is equal to or less than a predetermined gradient. In this case, panning is determined to be nearly finished. In the opposite case, when the value is equal to or greater than the predetermined value, panning is determined to not be nearly finished. The predetermined value of the absolute value and the predetermined gradient value may be preset values or may be calculated each time from the signal from which panning is detected. The predetermined value of the absolute value can be a value a predetermined times (less than 1) the maximum value of the signal when panning, and the predetermined gradient value can be a value a predetermined times (less than 1) of average gradient until the maximum value of the signal when panning.

In step S2007, the coefficient Fcls of the third correction amount is decreased and correction of blur of a lower frequency is executed. For example, if the value of Fcls prior to change is Fcls3 (Hz), it is changed to Fcls2 (Hz), if Fcls2 (Hz), it is changed to Fcls 1 (Hz), and if the value prior to change is Fcls0 (Hz), it is not changed.

At the same time, the gain β of the correction amount Hl obtained by control of the correction lens and the gain βs of the correction amount Hs obtained by control of the shift mechanism are decreased. If the value of βl, βs prior to change is βl3(%), βs3(%), it is changed to βl2(%), βs2(%), if βl2(%), βs2(%), it is changed to βl=βs=100%, and if βl, βs are 100%, it is not changed. In this way, correction of blur of lower frequency can be executed when panning is nearly finished.

Also, an image of more than one frame is used to detect a motion vector, making detection take time. To reduce the effects of slow speed camera movement such as when tracking a subject with small movement, on the basis of the values of Fcls of the third correction amount currently set, the gain βl of the correction amount Hl obtained by control of the correction lens, and the gain βs of the correction amount Hs obtained by control of the shift mechanism, the coefficient Fcc and the gain βc of the correction amount obtained by control of the image cutout position is reset as indicated in FIG. 22.

If the coefficient Fcls of the high-pass filter of the third blur correction amount is Fcls2 (Hz) (in this case, the gains β1, βs of the correction lens and the shift mechanism are βls2), as Fcc of the correction amount obtained by control of the image cutout position, the cut-off frequency which is the lowest between Fcc2 and the current setting value is selected. As the gain βc in this case, the highest value between βc2 and the current setting value is selected. The same applies to the other cases.

On the other hand, when panning is determined to be not nearly finished in step S2006, the process proceeds to step S2010 where integration of the vector detection result is executed. Note that the result of vector integration is reset in step S2004.

Thereafter, the process proceeds to step S2011, where the absolute value of the vector integration value (electronic blur correction amount) is decreased and whether or not the absolute value is less than a predetermined value is determined. When the condition is satisfied, the process proceeds to step S2012, and when not satisfied, the process proceeds to step S2013. However, in the case in which a predetermined amount of time has not elapsed from the start of vector integration, the process proceeds to step S2005 without executing the processing described below. This is because the integration value from a case in which the predetermined amount of time has not elapsed from the start of integration has low reliability.

In step S2012, on the basis of the coefficient Fcls of the high-pass filter of the third correction amount, setting of the coefficient Fcc and the gain βc of the high-pass filter of the correction amount obtained by control of the image cutout position is executed. Here, the coefficient Fcls of the third correction amount is set lower than the coefficient Fcc of the correction amount obtained by control of the image cutout position.

When the absolute value of the vector integration value (electronic blur correction amount) is low and decreasing, movement of the subject can be considered to be being tracked. Thus, settings capable of blur correction of a wide range of frequencies are set.

First, the coefficient Fcls and the coefficient Fcc are compared and when the coefficient Fcls is not less than the coefficient Fcc, the coefficient Fcls is decreased/changed to a value equal to or less than the coefficient Fcc. However, in the case in which the coefficient Fcls is already Fcls0 (Hz), i.e., the lowest frequency, the value is not changed.

In the case of Fcls≥Fcc, Fcc is changed as follows:
When Fcls=Fcls0, Fcc=Fcc1
When Fcls=Fcls1, Fcc=Fcc2
When Fcls=Fcls2, Fcc=Fcc3
When Fcls=Fcls3, Fcc=Fcc3.

Also, in accordance with the changed coefficient Fcc, the gain βc is changed as follows:
When Fcc=Fcc1, =βc1
When Fcc=Fcc2, =βc2
When Fcc=Fcc3, =βc3.

Then, in step S2013, the absolute value of the vector integration value (electronic blur correction amount) is increased and whether or not the absolute value is greater than a predetermined value is determined. When the condition is satisfied, the process proceeds to step S2014, and when not satisfied, the process proceeds to step S2005.

In step S2014, on the basis of the coefficient Fcc of the correction amount obtained by control of the image cutout position, setting of the coefficient Fcls of the third correction amount and the gains β1, βs of the correction lens and the shift mechanism is executed. Here, the coefficient Fcls of the third correction amount is set higher than Fcc of the correction amount obtained by control of the image cutout position.

When the absolute value of the vector integration value (electronic blur correction amount) is high and increasing, movement of the subject can be considered to be not being tracked. Thus, the ratio of the correction amount of higher frequency is increased.

First, the coefficient Fcls and the coefficient Fcc are compared and when the coefficient Fcls is not higher than the coefficient Fcc, the coefficient Fcls is increased/changed. However, in the case in which Fcls is already Fcls0 (Hz), i.e., the lowest frequency, the value is not changed.

In the case of Fcls≤Fcc, Fcc is changed as follows:
When Fcc=Fcc0 or Fcc=Fcc1, Fcls=Fcls2
When Fcc=Fcc2, Fcls=Fcls3
When Fcc=Fcc3, Fcls=Fcls3.

Also, in accordance with the changed Fcls, the gains β1, βs are changed as follows:
When Fcls=Fcls2, (β1==βls2
When Fcls=Fcls3, (β1==βls3.

Also, depending on the gain βc of the correction amount obtained by control of the image cutout position, the display of the finder is change and the user may be warned. A display such as turning on or flashing an LED in the finder to warn the user that space for the correction stroke is decreasing may be displayed or, if by default the display of the peripheral portion of the finder is semitransparent, the semitransparent portion may be darkened in correspondence with the decrease in space of the correction stroke.

Also, by observing the phase difference between the output of the angular velocity sensor 112 and the vector detection result in advance, the blur correction performance can be improved. Because a delay in detection occurs due to more than one frame being needed to detect a vector, this delay amount is calculated and obtained in advance. From the output of the angular velocity sensor, hand shake, the calculated value of the delay amount of the vector, and the actual value are associated together. This enables a vector integration value (electronic blur correction amount) that takes into account detection delay to be calculated. This enables the setting of the coefficient Fcc and gain of the correction amount obtained by control of the image cutout position, the coefficient Fcls of the third correction amount, and the gains β1, βs of the correction lens and the shift mechanism using the vector integration value (electronic blur correction amount) to be executed with high accuracy.

A signal set with the coefficient Fc and the gain β obtained in this manner is output to each of the correction mechanisms and blur correction is executed.

As described above, in the present embodiment, depending on the target of interest of the user, the correction ratio between hand shake and subject shake is controlled, allowing a blur correction effect desired by the user to be obtained.

Furthermore, the correction amount obtained by control of the image cutout position and the coefficient and the gain of the high-pass filter of the third blur correction amount can be switched in accordance with the signals of each other. In this way, blur correction stroke insufficiency can be avoided and both prevention of the main subject being out of frame and blur correction with a large effect on image deterioration can be achieved.

Note that the technology described in the present embodiment can be applied to both video and still images. In the case of video, depending on the scene, hand shake correction and subject shake correction can be continuously switched between, which minimizes or prevents off-putting subtle image shifts caused by switching. In the case of still images, an image with a good balance between hand shake and subject shake can be generated. Also, this can also be applied to particular still image capturing methods such as panning.

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An apparatus comprising:
   at least one processor; and
   at least a memory coupled to the at least processor storing instructions that, when executed by the at least processor, cause the at least processor to function as:
   a subject detection unit configured to detect a specific subject in an input image and output subject information;
   an acquisition unit configured to acquire camera information including at least one of shutter speed, AF area information, focal length, inertial sensor information, depth information, and line-of-sight information;
   an estimation unit configured to estimate a target of interest in an image based on the subject information and the camera information;
   a first motion detection unit configured to detect background motion and subject motion in an input image;
   a conversion unit configured to convert the detected background motion and the detected subject motion to a first blur correction amount for correcting background blur and a second blur correction amount for correcting subject blur, respectively; and
   a correction amount calculation unit configured to, based on the estimated target of interest, combine the first blur correction amount and the second blur correction amount and generate a final blur correction amount.

2. The apparatus according to claim 1,
   wherein the first motion detection unit detects a motion vector of the input image and separates the motion vector into a first motion vector indicative of background motion and a second motion vector indicative of subject motion, and
   wherein the conversion unit converts the first motion vector and the second motion vector to the first blur correction amount and the second blur correction amount, respectively.

3. The apparatus according to claim 1,
   wherein the acquisition unit further acquires a signal from an angular velocity sensor configured to detect shake of an image capture device,
   wherein the first motion detection unit detects a motion vector of the input image and separates the motion vector into a first motion vector indicative of background motion and a second motion vector indicative of subject motion, and
   wherein the conversion unit converts the shake detected by the angular velocity sensor and the second motion vector to the first blur correction amount and the second blur correction amount, respectively.

4. The apparatus according to claim 2,
   wherein the at least one processor is configured to further function as a reliability calculation unit configured to calculate a reliability of the motion vector and a separation degree calculation unit configured to calculate a separation degree between the first motion vector and the second motion vector, and
   wherein the correction amount calculation unit, based on the estimated target of interest, the calculated reliability of the motion vector, and the separation degree between the first motion vector and the second motion vector, combine the first blur correction amount and the second blur correction amount and generate a final blur correction amount.

5. The apparatus according to claim 1, wherein the subject information includes at least one of subject position and size, subject person-likeness, and subject motion.

6. The apparatus according to claim 1, wherein the estimation unit, based on at least one of the subject information and the camera information, calculates at least one of a background degree indicative of a degree to which a background is the target of interest and a subject degree indicative of a degree to which a subject is the target of interest.

7. The apparatus according to claim 2, wherein the first motion detection unit, based on the subject information and an amount of the motion vector, separates the motion vector into the first motion vector and the second motion vector.

8. The apparatus according to claim 1, wherein the at least one processor is configured to further function as a determination unit configured to determine an effect of blur correction based on the second blur correction amount and a display control unit configured to display the input image and a display item corresponding to a determination result by the determination unit, and
   wherein the determination unit, based on the second blur correction amount and at least one of the target of interest, the first blur correction amount and the second blur correction amount, reliability of the subject information, reliability of the second motion vector, a separation degree between the first motion vector and the second motion vector, and an upper limit of a blur correction amount, determines the effect of blur correction.

9. The apparatus according to claim 8, wherein the determination unit determines the effect of the blur correction based on the second blur correction amount to be higher in a case in which a degree to which a subject is the target of interest is a first value compared to a case in which the degree is a second value less than the first value.

10. The apparatus according to claim 8, wherein the determination unit determines the effect of the blur correction based on the second blur correction amount to be higher in a case in which an absolute value of a difference between the first blur correction amount and the second blur correction amount is a third value compared to a case in which the absolute value of the difference is a fourth value less than the third value.

11. The apparatus according to claim 8, wherein the determination unit determines the effect of the blur correction based on the second blur correction amount to be higher in a case in which a value obtained by subtracting the second blur correction amount from the upper limit of the blur correction amount is a fifth value compared a case in which the value is a sixth value less than the fifth value.

12. The apparatus according to claim 8, wherein the determination unit determines the effect of the blur correction based on the second blur correction amount to be present when a state in which the effect of the blur correction based on the second blur correction amount is higher than a predetermined threshold has continued for a predetermined amount of time or longer.

13. The apparatus according to claim 8, wherein the display unit displays a first display item corresponding to a blur correction based on the first blur correction amount when the effect of the blur correction based on the second blur correction amount is determined by the determination unit to not be present and displays a second display item corresponding the blur correction based on the second blur correction amount when the effect of the blur correction based on the second blur correction amount is determined to be present.

14. The apparatus according to claim 1, wherein the at least one processor is configured to further function as a second motion detection unit configured to detect motion of the apparatus,
wherein the conversion unit is further configured to convert the motion of the apparatus detected by the second motion detection unit to a third blur correction amount for correcting blur, and
wherein the correction amount calculation unit, based on the estimated target of interest, calculates the final blur correction amount from the first blur correction amount, the second blur correction amount, and the third blur correction amount and
executes filter processing on an output of the first motion detection unit and an output of the second motion detection unit and sets a filter characteristic or an output gain in accordance with the respective outputs.

15. The apparatus according to claim 14, wherein the correction amount calculation unit, based on an output of the first motion detection unit, executes processing of at least one of increasing a cut-off frequency or decreasing an output gain of a filter of an output of the second motion detection unit, in a case in which a speed of the motion of the image stabilization apparatus is determined by the second motion detection unit to be equal to and greater than a first predetermined value.

16. The apparatus according to claim 14, wherein the correction amount calculation unit, based on an output of the second motion detection unit, executes processing of at least one of decreasing a cut-off frequency and increasing an output gain of a filter of an output of the first motion detection unit, in a case in which a speed of the motion of the image stabilization apparatus is determined by the second motion detection unit to be equal to or less than a second predetermined value.

17. The apparatus according to claim 1, further comprising an image capture device configured to capture a subject image and generate an input image.

18. A method comprising:
detecting a specific subject in an input image and outputting subject information;
acquiring camera information including at least one of shutter speed, AF area information, focal length, inertial sensor information, depth information, and line-of-sight information;
estimating a target of interest in an image based on the subject information and the camera information;
detecting background motion and subject motion in an input image;
converting the detected background motion and the detected subject motion to a first blur correction amount for correcting background blur and a second blur correction amount for correcting subject blur, respectively; and
based on the estimated target of interest, combining the first blur correction amount and the second blur correction amount and generating a final blur correction amount.

19. A non-transitory computer readable storage medium storing a program causing a computer to perform a method, the method comprising:
detecting a specific subject in an input image and output subject information;
acquiring camera information including at least one of shutter speed, AF area information, focal length, inertial sensor information, depth information, and line-of-sight information;
estimating a target of interest in an image based on the subject information and the camera information;
detecting background motion and subject motion in an input image;
converting the detected background motion and the detected subject motion to a first blur correction amount for correcting background blur and a second blur correction amount for correcting subject blur, respectively; and
based on the estimated target of interest, combining the first blur correction amount and the second blur correction amount and generate a final blur correction amount.

20. The apparatus according to claim 8, wherein an icon which indicates that a subject shake correction is effective is displayed in a case where the determination unit determines that an effect of the subject shake correction is large and an icon which indicates that a hand shake correction is effective is displayed in a case where the determination unit determines that an effect of the subject shake correction is small.

21. The apparatus according to claim 1,
wherein the at least one processor is configured to further function as a second motion detection unit configured to detect motion of the apparatus, wherein the conversion unit is further configured to convert the motion of the apparatus detected by the second motion detection unit to a third blur correction amount for correcting blur, and wherein the correction amount calculation unit, based on the estimated target of interest, calculates the final blur correction amount from the first blur correction amount, the second blur correction amount, and the third blur correction amount.

* * * * *